United States Patent
Kishimoto

(10) Patent No.: US 10,976,617 B2
(45) Date of Patent: *Apr. 13, 2021

(54) DISPLAY APPARATUS AND METHOD FOR MANUFACTURING DISPLAY APPARATUS

(71) Applicant: Sakai Display Products Corporation, Osaka (JP)

(72) Inventor: Katsuhiko Kishimoto, Osaka (JP)

(73) Assignee: SAKAI DISPLAY PRODUCTS CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/881,630

(22) Filed: May 22, 2020

(65) Prior Publication Data
US 2020/0292866 A1 Sep. 17, 2020

Related U.S. Application Data

(63) Continuation of application No. 16/079,725, filed as application No. PCT/JP2017/046189 on Dec. 22, 2017, now Pat. No. 10,698,274.

(51) Int. Cl.
*H05K 7/02* (2006.01)
*H05K 7/04* (2006.01)
(Continued)

(52) U.S. Cl.
CPC ...... *G02F 1/13458* (2013.01); *B60R 11/0235* (2013.01); *G02F 1/13452* (2013.01);
(Continued)

(58) Field of Classification Search
USPC .................................................. 361/809, 810
See application file for complete search history.

(56) References Cited

U.S. PATENT DOCUMENTS 4,738,625 A 4/1988 Burton et al.
5,760,862 A 6/1998 Bachus
(Continued)

FOREIGN PATENT DOCUMENTS

JP  H08248436 A  9/1996
JP  H1069980 A   3/1998
(Continued)

OTHER PUBLICATIONS

PCT International Search Report, International Application No. PCT/JP2017/046189, Japan Patent Office. Mar. 6, 2018.
(Continued)

*Primary Examiner* — Hung S. Bui
(74) *Attorney, Agent, or Firm* — Snell & Wilmer L.L.P.

(57) ABSTRACT

A display apparatus comprises: a display panel comprising driving elements to drive pixels and a first terminal group electrically connected to the driving elements; a supporting member comprising a surface on which the display panel is to be placed, and comprising wirings and a second terminal group connected to the wirings; and a holding member provided along an edge of the display panel. The holding member comprises a connector provided with contactors, and is adhered to the surface to hold the display panel. Each of the contactors is positioned in such a way as to face each terminal of the first terminal group. Each of the contactors is connected to each terminal of the second terminal group. The edge of the display panel is coupled with the connector. Each terminal of the first terminal group is electrically connected to each of the wirings via each of the contactors.

20 Claims, 9 Drawing Sheets

(51) Int. Cl.
  *G02F 1/1345* (2006.01)
  *B60R 11/02* (2006.01)
  *G02F 1/1333* (2006.01)
  *G02F 1/1335* (2006.01)
  *G09F 9/30* (2006.01)
  *G09F 21/04* (2006.01)
  *B60R 11/00* (2006.01)

(52) U.S. Cl.
  CPC .. *G02F 1/133308* (2013.01); *G02F 1/133512* (2013.01); *G09F 9/30* (2013.01); *G09F 21/04* (2013.01); *B60R 2011/0026* (2013.01); *G02F 2001/133325* (2013.01)

(56) References Cited

U.S. PATENT DOCUMENTS

| | | | |
|---|---|---|---|
| 6,091,474 A | 7/2000 | Middleton et al. | |
| 6,191,838 B1 | 2/2001 | Muramatsu | |
| 6,296,493 B1 | 10/2001 | Michiya | |
| 6,312,263 B1 | 11/2001 | Higuchi et al. | |
| RE37,945 E | 12/2002 | Kanezawa | |
| 10,698,274 B2 * | 6/2020 | Kishimoto | G02F 1/133512 |
| 2006/0109614 A1 | 5/2006 | Lee et al. | |

FOREIGN PATENT DOCUMENTS

| | | |
|---|---|---|
| JP | H10333597 A | 12/1998 |
| JP | 2000502471 A | 2/2000 |
| JP | 2001110488 A | 4/2001 |
| JP | 2004354792 A | 12/2004 |
| JP | 2006146214 A | 6/2006 |
| JP | 3149814 U | 4/2009 |
| JP | 2009109733 A | 5/2009 |
| JP | 2011107321 A | 6/2011 |
| JP | 2012156913 A | 8/2012 |
| JP | 2016097650 A | 5/2016 |
| JP | 2016134548 A | 7/2016 |
| WO | 9815872 A1 | 4/1998 |
| WO | 2016194323 A1 | 12/2016 |

OTHER PUBLICATIONS

English Translation of PCT International Search Report, International Application No. PCT/JP2017/046189, Japan Patent Office. Mar. 6, 2018.

* cited by examiner

DISPLAY APPARATUS AND METHOD FOR MANUFACTURING DISPLAY APPARATUS

CROSS-REFERENCE TO RELATED APPLICATIONS

This patent application is a continuation of, and claims priority to, U.S. patent application Ser. No. 16/079,725 having a filing/§ 371(c) date of Jul. 29, 2019 (now U.S. Pat. No. 10,698,274, which issued 30 Jun. 2020), which is a U.S. National Stage of International Application No. PCT/JP2017/046189, filed on 22 Dec. 2017 (expired). The entire disclosure of each patent application set forth in the Cross-Reference to Related Applications section is hereby incorporated by reference.

TECHNICAL FIELD

The present invention relates to a display apparatus and a method for manufacturing display apparatus.

BACKGROUND ART

Display panels formed using a resin film or a thin glass plate as a base material are recently used for flat panel display apparatuses such as organic-EL display apparatuses and liquid crystal display apparatuses to satisfy requirements for thinning. In many display apparatuses, a thin display panel comprising a very thin material such as a resin film as a base material is pasted on a surface of an arbitrary support to assure shape retainability or mechanical strength suitable for the purpose of use. For example, Patent Document 1 discloses a digital signage comprising an image display panel pasted on a glass plate. In Patent Document 1, a display surface of the image display panel is pasted to a window glass via a layer containing a photocuring resin.

PRIOR ART DOCUMENT

Patent Document

Patent Document 1: JP 2016-97650 A

SUMMARY OF THE INVENTION

Problem to be Solved by the Invention

It is very difficult to remove a display panel from a support when the display panel is adhered to the support using an adhesive containing a photocuring or thermosetting resin as disclosed in Patent Document 1. Therefore, for example, when a defect occurs in either one of the display panel and the support, it is considered that continuously using the other one thereof that maintains normal functions or reusing the display panel or the support in another apparatus is difficult. Further, according to the pasting method disclosed in Patent Document 1, it is difficult to accurately paste the display panel to a given position on the glass plate. In addition, it is necessary to separately prepare means for transmitting image signals to the display panel.

An object of the present invention is to provide a display apparatus where a display panel or a support thereof can be easily reused in the display apparatus or another display apparatus and which comprises means for transmitting signals to the display panel without impairing aesthetic appearance of the display apparatus. Further, another object of the present invention is to provide a method for manufacturing display apparatus capable of easily manufacturing a display apparatus, according to which reusing constituent elements is easy, a display panel is properly positioned, and means for transmitting signals to the display panel is provided so as not to impair aesthetic appearance of the display apparatus.

Means to Solve the Problem

A display apparatus according to one embodiment of the present invention comprises: a display panel comprising a plurality of driving elements to drive pixels, and comprising a first terminal group at least at a part of an edge of the display panel, the first terminal group being electrically connected to the plurality of driving elements; a supporting member comprising a surface on which the display panel is to be placed, and comprising, on the surface, a plurality of wirings and a second terminal group connected to the plurality of wirings; and a holding member provided along an edge of the display panel using a rod-shaped material having a linear or curved shape, wherein the holding member comprises a connector provided with a plurality of contactors, and is adhered to the surface so as to hold the display panel at a given position on the surface of the supporting member, wherein each one of the plurality of contactors is positioned in such a way as to face each of terminals constituting the first terminal group, each one of the plurality of contactors is connected to each of terminals constituting the second terminal group, and at least a part of the edge of the display panel is coupled with the connector, and each of terminals constituting the first terminal group is electrically connected to each one of the plurality of wirings of the supporting member via each one of the plurality of contactors.

A method for manufacturing display apparatus according to another embodiment of the present invention comprises: forming a display panel comprising pixels, a plurality of driving elements to drive the pixels, and a first terminal group electrically connected to the plurality of driving elements; forming a plurality of wirings and a second terminal group connected to the plurality of wirings on a surface of a supporting member, wherein the supporting member comprises the surface on which the display panel is to be placed; forming a connector at a part of a rod-shaped material having a linear or curved shape by arranging a plurality of contactors on the rod-shaped material in a layout corresponding to a layout of each of terminals constituting the first terminal group; providing a holding member to hold the display panel on the surface by adhering the rod-shaped material to the surface of the supporting member; connecting each of terminals constituting the second terminal group and each one of the plurality of contactors; connecting each of terminals constituting the first terminal group to each one of the plurality of contactors by coupling at least a part of an edge of the display panel with the connector; and placing the display panel on the surface of the supporting member.

Effects of the Invention

According to an embodiment of the present invention, the display panel or the supporting member can be easily reused in the display apparatus or another display apparatus, and the means for transmitting signals to the display panel can be provided without impairing aesthetic appearance of the display apparatus. Further, according to another embodiment of the present invention, it is possible to easily manufacture the display apparatus in which reusing constituent elements is easy, the display panel is properly positioned, and the means for transmitting signals to the display panel is provided without impairing aesthetic appearance of the display apparatus.

EMBODIMENT FOR CARRYING OUT THE INVENTION

Figure 1:
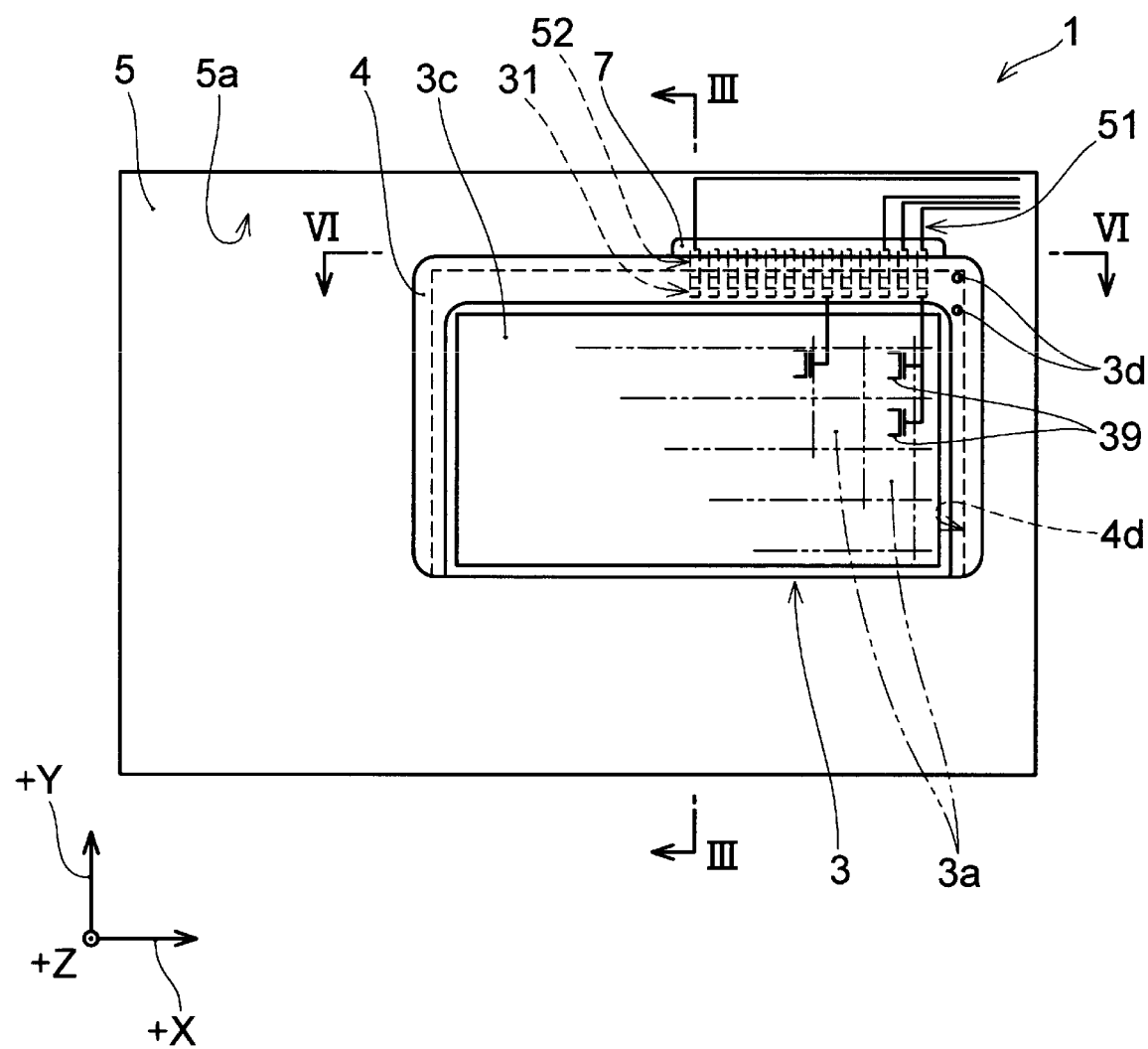
FIG. 1 shows a front view of an example of a display apparatus according to Embodiment 1 of the present invention.

The inventor of the present invention has intensively studied structures for a display apparatus comprising a display panel fixed to the surface of a support, which can realize the reuse of the defect-free display panel or the defect-free support, in the case of the occurrence of a defect in a part of constituent elements. And, it has been found that employing a structure in which the display panel is fixed to the support via a member capable of holding the display panel at a given position on the support can appropriately fix the display panel to the surface of the support and can easily remove the display panel from the support as needed. In other words, the display panel is not adhered to the support by means of an adhesive and engages with the holding member that is configured to hold the display panel on the support, and the holding member is adhered to the support. Since the holding member restricts the movement of the display panel relative to the support, the display panel can be fixed to the given position on the surface of the support. In addition, when the display panel is removed from the support, the display panel can be easily removed from the support by separating the holding member and the display panel that are not mutually adhered to and are simply engaged with each other.

Further, the inventor of the present invention has found that aesthetic appearance of the display apparatus can be improved by providing, on the support, wiring for transmitting a driving signal to be applied to the display panel held on the support. In other words, conventionally, although a flexible printed circuit (FPC) or the like has been mainly used as such wiring, the inventor of the present invention has found a problem of preventing the aesthetic appearance of the display apparatus from being impaired by the wiring such as FPC and also found the solution to the problem. In a conventional display apparatus, the FPC or the like constituting the wiring is connected at an edge thereof to the display panel, a driver that generates a driving signal, or the like. However, the FPC or the like is used in a state where an intermediate portion thereof is not fixed but floated in the air, and further in a state where it is deflected mainly toward a viewer of the display apparatus so that no tension is added. In conventional TV receivers, smartphones, and the like, the wiring such as the FPC is covered with a casing or the like and therefore cannot be seen by a viewer of the display apparatus. However, in a case where no casing is provided considering the ease of removing from the support, the FPC comprising a large number of wirings floated in the air in the periphery of the display panel, or a large number of wirings arranged in parallel with one another, is liable to be seen by a viewer of the display apparatus and, accordingly, can impair the aesthetic appearance of the display apparatus. For example, the wiring that shakes when subjected to vibrations spoils the view. In particular, in a case where the display apparatus is disposed in a relatively narrow space such as a vehicular compartment and a viewer in the vicinity thereof gazes at a display screen, such shakable wiring can deteriorate the appearance quality of the display apparatus.

On the other hand, the inventor of the present invention has found providing a connector connectable to the display panel on the above-mentioned holding member while providing the wiring on the support, and connecting the display panel and the wiring on the support via the connector by causing the display panel to engage with the holding member. By doing so, replacement of the display panel including electrically connecting to and separating from the driver or the like becomes easy, and unshakable wiring can be orderly arranged at a position deeper than the display screen in a view from a viewer of the display apparatus. As a result, a neat impression can be given to a user, and the aesthetic appearance of the display apparatus can be improved although in the prior art there was a possibility that the aesthetic appearance was likely to be worsened by the wiring around the display panel.

Next, a display apparatus and a method for manufacturing display apparatus according to embodiments of the present invention will be described with reference to attached drawings. In the following embodiments, materials and shapes of respective constituent elements and relative positional relationships between them are merely illustrative. The display apparatus and the method for manufacturing display apparatus according to the present invention is not to be construed to be limited thereto.

[Display Apparatus]

Figure 2:
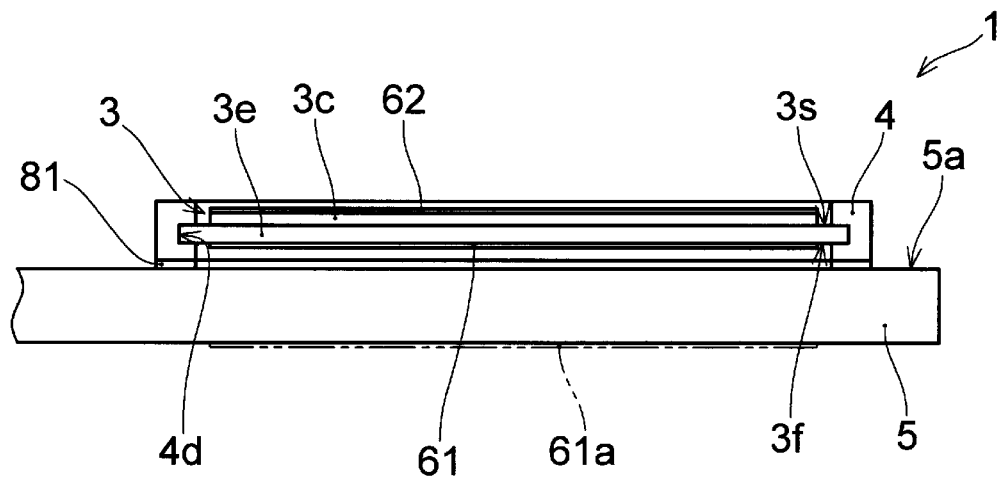
FIG. 2 shows a bottom view of the display apparatus shown in FIG. 1, viewed from below in FIG. 1.
Figure 3:
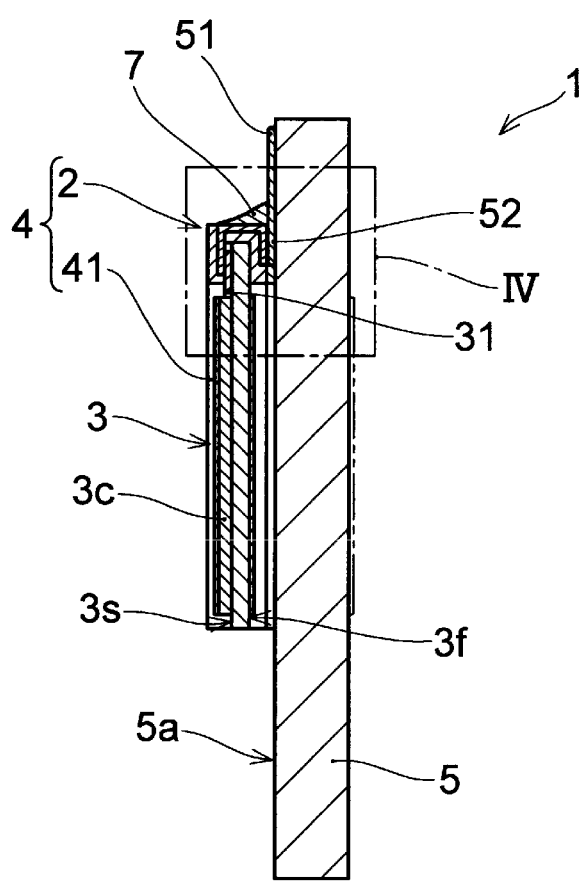
FIG. 3 shows a cross-sectional view along a line III-III in FIG. 1.
Figure 4:
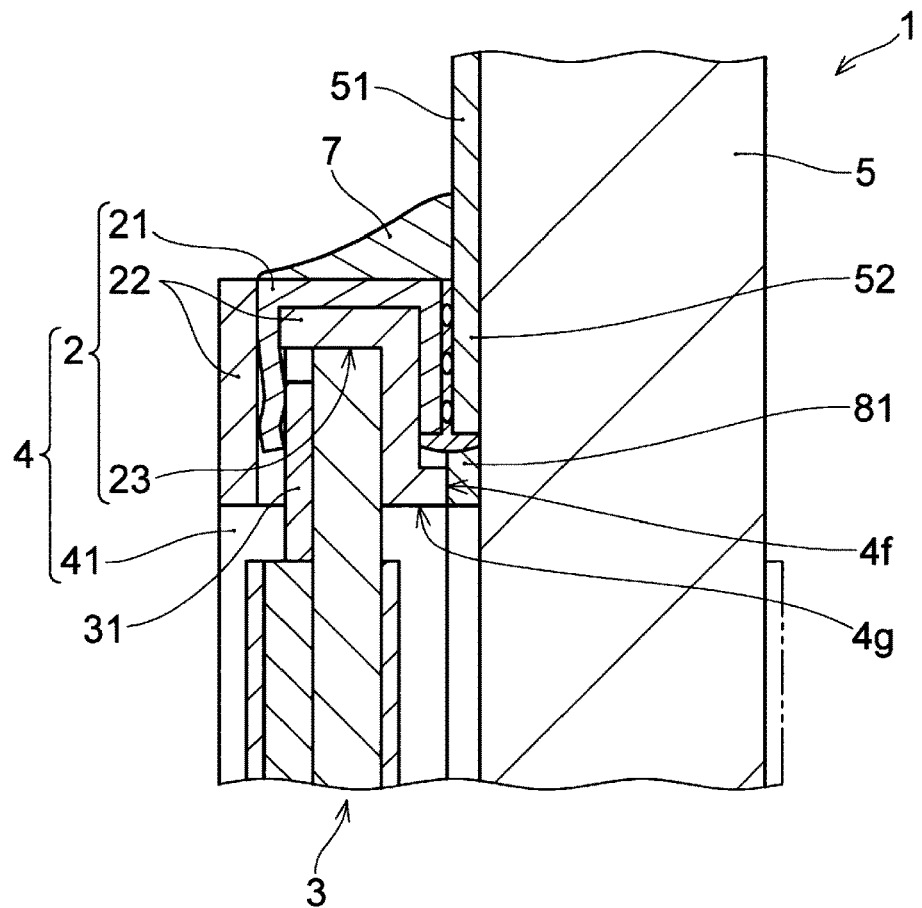
FIG. 4 shows an enlarged view of a part IV shown in FIG. 3.

FIG. 1 shows a front view of a display apparatus 1 according to Embodiment 1. FIG. 2 shows a bottom view of surroundings of a display panel 3 viewed from below in FIG. 1. FIG. 3 shows a cross-sectional view along a line III-III in FIG. 1. FIG. 4 shows an enlarged view of a part IV shown in FIG. 3. The display apparatus 1 comprises the display panel 3 which comprises a first terminal group 31 at least at a part of an edge of the display panel 3 and a plurality of driving elements 39 to drive pixels 3a, the first terminal group 31 electrically connected to the plurality of driving elements 39; a supporting member 5 comprising a surface 5a on which the display panel 3 is to be placed, a plurality of wirings 51 and a second terminal group 52 connected to the plurality of wirings 51 provided on the surface 5a, and a holding member 4 provided along the edge of the display panel 3 using a rod-shaped material having a curved shape. In the example shown in FIG. 1, the holding member 4 is a frame body formed using a rod-shaped material curved into a U shape and comprising a discontinuous portion at one edge. The display panel 3 is engaged with the holding member 4 at a part of the edge of the display panel 3. The holding member 4 is adhered to the surface 5a so as to hold the display panel 3 at a given position on the surface 5a of the supporting member 5.

As shown in FIG. 4, the holding member 4 comprises a connector 2 comprising a plurality of contactors 21 each one of which is positioned in such a way as to face each of the terminals constituting the first terminal group 31, and each one of the plurality of contactors 21 is connected to each of the terminals constituting the second terminal group 52. Further, at least a part of the edge (an upper edge in the example shown in FIG. 1) of the display panel 3 is coupled with the connector 2, and each of the terminals constituting the first terminal group 31 is electrically connected to each one of the plurality of wirings 51 of the supporting member 5 via each one of the plurality of contactors 21. In FIGS. 1, 3, and 4, a region denoted by reference numeral 7 indicates a covering member 7 described below.

In the present embodiment, the display panel 3 is engaged with the holding member 4 at an edge thereof and is held at the given position on the surface 5a of the supporting member 5 by the holding member 4. However, the display panel 3 itself is not adhered to the supporting member 5. Accordingly, the display panel 3 can be easily removed from the supporting member 5 by pulling out the display panel 3 from the connector 2 and separating the display panel 3 and the holding member 4 that are merely engaged with each other. Accordingly, in the case of the occurrence of a defect in the supporting member 5, the display panel 3 can be easily reused by removing the display panel 3 and combining it with another supporting member. Further, when the display panel 3 is broken, the supporting member 5 can be reused by removing the display panel 3 and placing another display panel.

Further, the first terminal group 31 connected to the driving elements 39 of the display panel 3 is connected to the wirings 51 via the contactors 21 of the connector 2 and the second terminal group 52. Accordingly, the driving signal can be applied to the driving elements 39 by connecting conductive wires (not shown) connected to a driver (not shown) or the like to the wirings 51. In other words, it is unnecessary to arrange conventional wiring comprising FPC or the like in a state where it is floated in the air. The connection between the conductive wires connected to the driver (not shown) or the like and the wirings 51 can be performed at arbitrary positions of the wirings 51. For example, the connection can be performed at positions away from the display panel 3 (e.g., distal ends of the wirings 51 with respect to the display panel 3). Accordingly, the aesthetic appearance of the display apparatus 1 can be prevented from being impaired by the wiring such as the FPC extending from the display panel 3 toward the driver or the like.

Further, since the holding member 4 comprises the connector 2, not only the display panel 3 and the holding member 4 can be engaged together but also the driving elements 39 and the contactors 21 can be electrically connected via the first terminal group 31. In other words, in the case where the holding member 4 is adhered beforehand to the supporting member 5 and the contactors 21 are connected to the second terminal group 52, it is possible to electrically connect the driving elements 39 and the wirings 51 to each other concurrently with the engagement of the display panel 3 and the holding member 4. Further, in the case where the wirings 51 are connected beforehand to the driver, it is possible to electrically connect the driving elements 39 and the driver to each other concurrently with the engagement of the display panel 3 and the holding member 4. Even when the display panel 3 is removed from the supporting member 5, separation of the holding member 4 and the display panel 3 and electrical disconnection between the driving elements 39 and the driver can be simultaneously performed. In other words, replacement of the display panel 3 or the supporting member 5 including the electrical connection to and disconnection from the driver or the like can be easily performed. Further, since in the connection via the connector 2, unlike the case of using solder or the like, deterioration in strength at the connecting portion due to, for example, enlargement of intermetallic compounds according to a temperature change does not occur in principle, it is considered that connection reliability between the display panel and the driver can be improved.

In the example shown in FIGS. 1 to 4, the display panel 3 has a rectangular front shape and has a surface (a first surface 3f) to be directed to the supporting member 5 and has a pixel forming region 3c on a second surface 3s that is opposite the first surface 3f. In the pixel forming region 3c, a plurality of pixels 3a are formed so as to constitute a matrix pattern. The pixel 3a comprises the driving element 39 connected to the first terminal group 31. The plurality of pixels 3a are merely shown schematically in FIG. 1, so that it is possible to form far more pixels 3a according to the screen size and the resolution of the display panel 3, compared to the example shown in FIG. 1. Further, each pixel 3a can comprise a plurality of driving elements 39. As an example of the display panel 3, an organic-EL display panel or a liquid crystal display panel is shown. In the cross-sectional view of FIG. 2 or the like, the pixel forming region 3c is shown so as to protrude from the surface (e.g., the second surface 3s in FIG. 2) of the display panel 3, as an example in which the display panel 3 is the organic-EL display panel. However, in the case where the display panel 3 is the liquid crystal display panel, the pixel forming region 3c does not necessarily have to protrude from the surroundings thereof on the surface of the display panel 3.

The display panel 3 has a margin portion, which is not occupied by the pixel forming region 3c, on the second surface 3s. In the example shown in FIG. 1, the display panel 3 has the margin portion in the vicinity of one side (an upper side in FIG. 1) of the rectangular front shape, and the margin portion has a longitudinal direction along the one side. The plurality of terminals constituting the first terminal group 31 is arrayed along the longitudinal direction of the margin portion. For example, each terminal constituting the first terminal group 31 has a width approximately 50 μm or more and approximately 300 μm or less in the array direction and can be arrayed at a pitch approximately 100 μm or more and approximately 600 μm or less. Further, for example, each terminal constituting the first terminal group 31 can have a thickness 5 μm or more and 30 μm or less. However, the width, the array pitch, and the thickness of each terminal constituting the first terminal group 31 are not construed to be limited to the above-mentioned values. Each terminal constituting the first terminal group 31 is formed of a light-shielding metal such as copper or nickel, or a light-transmitting conductive material such as indium tin oxide (ITO) or indium oxide-zinc oxide (IZO). Further, it is desirable to comprise a coating layer made of a gold plating film on a conductor pattern formed by the above-mentioned material. This is because there is no formation of a natural oxide film and good electrical connection can be maintained even when it is attached to or detached from the connector 2.

In each of cross-sectional and bottom views shown in FIGS. 2 to 4 and referred to in the following description, each constituent element is emphatically shown, as needed, in the thickness direction of the display panel 3 for ease of viewing the first and second terminal groups 31 and 52 and the like. Therefore, a space is produced between the display panel 3 and the supporting member 5. However, the actual thickness of each of terminals in the second terminal group 52 is approximately several μm as described below. Further, the thickness of an interposed portion of the connector 2 between the display panel 3 and the supporting member 5 is also approximately several mm. Therefore, the display panel 3 can be in contact with the supporting member 5 in the majority of the first surface 3f. Further, the space between the display panel 3 and the supporting member 5 can be filled with an arbitrary layered material. For example, a weak adhesive layer (not shown) formed of an adherent material can be provided between the display panel 3 and the supporting member 5. By providing such a weak adhesive layer, the display panel 3 and the supporting member 5 can be brought into close contact with each other without causing any gap. Further, when the display panel 3 is removed from the supporting member 5, since the weak adhesive layer simply holds close contact, the display panel 3 can be easily peeled off the surface 5a. Such a weak adhesive layer comprises, for example, an adhesive agent, including an acrylic resin, a silicone resin, or a urethane resin, singly or in combination thereof, as a main component.

The supporting member 5 is not construed to be particularly limited with respect to the shape and material, as long as it can appropriately support the display panel 3. The supporting member 5 is preferably formed using a material that can constitute the surface 5a, on which the wirings 51 can be directly formed with sufficient adhesive strength. However, as described below, the wirings 51 can be formed in advance on a separate base material 50 (see FIG. 9) and then adhered to the surface 5a. Accordingly, the supporting member 5 is not necessarily required to enable the wirings 51 to be directly formed on the surface 5a. The supporting member 5 can be formed of an arbitrary material, such as glass, a metal, or a synthetic resin. Further, the supporting member 5 can be a glass plate that is used as a casing applicable to various devices, a windowpane of a residence, a shop window, or a display case. Further, the supporting member 5 can be constituted by a window glass for a vehicle, such as an automobile or a train. In that case, the surface 5a is, for example, a surface of the windshield of an automobile or the like, which is directed toward a vehicular compartment. Further, the surface 5 can be a flat surface, or can be a curved surface having an arbitrary curvature.

In the case where the supporting member 5 is a windshield of an automobile, the wirings 51 are preferably provided within an area to be an upper 20% region of a projection image of the windshield projected on a plane orthogonal to the back-and-forth direction of the automobile. Further, in the case where the wirings 51 are formed of a light-shielding metal material such as copper described below, it is preferable that no light-shielding member be present between wirings each of which is one of the plurality of wirings 51, or, in other words, it is preferable that the windshield be exposed between wirings each of which is one of the plurality of wirings 51. By doing so, the forward field of vision during driving can be sufficiently secured, and it is possible to contribute to safe navigation. "The windshield be exposed" means the state where the windshield can be visually recognized by a person in the vehicular compartment, and, as a result, the person in the vehicular compartment can look forward through the windshield. Accordingly, for example, "the windshield be exposed" includes a state where the windshield is covered with a transparent resin between the wirings 51 (or together with the wirings 51), in addition to a state where there is no object physically covering the windshield. By covering the windshield with the resin between the wirings 51 as mentioned above, the penetration of moisture from the interface between the wirings 51 and the windshield can be prevented and the windshield can be protected from an external mechanical stress. Further, it is possible to reduce unevenness on the surface of the windshield caused by the wirings 51.

A conductive paste including silver or the like, copper, titanium, aluminum, ITO, IZO, and the like are exemplary materials for the wirings 51 and the second terminal group 52. Further, similar to the above-mentioned first terminal group 31, it is preferable for the second terminal group 52 to comprise a coating layer made of a gold plating film on a conductor pattern formed of such a material. This is because good electrical connection to the contactors 21 can be maintained. When the supporting member 5 is formed of a light-transmitting material such as glass, it is preferable to form at least wirings 51 by a material that can transmit light, such as ITO and IZO, so as not to prevent light transmission. The wirings 51 and the second terminal group 52 are respectively formed to have a thickness of, for example, approximately 1 μm or more and approximately 300 μm or less. However, the thicknesses of the wirings 51 and the second terminal group 52 are not construed to be limited to the above-mentioned range.

The second terminal group 52 is preferably formed at a position facing the first terminal group 31 when the display panel 3 is positioned at the given position on the surface 5a. By doing so, the structure of the connector 2 and the shape of the contactors 21 can be simplified. In the example shown in FIG. 1, the plurality of terminals constituting the second terminal group 52 is arranged in a row at the same pitch as the array pitch of each of terminals constituting the first terminal group 31.

Members of the plurality of wirings 51 are parallel to each other and extend from the second terminal group 52 toward the edge of the supporting member 5. In the example shown in FIG. 1, the wirings 51 extend from the second terminal group 52 toward the outside of the display panel 3 in a direction orthogonal to the array direction of the second terminal group 52 and, via substantially right-angled crooked portions, extend toward the edge of the supporting member 5 which is along the direction orthogonal to the array direction of the second terminal group 52. Although not shown, preferably, the wirings 51 can comprise connecting portions with the conductive wires connected to the driver (not shown), preferably, at a distal end from the second terminal group 52. From the viewpoint of keeping such connecting portions away from the display panel 3 so that they are not easily seen by a viewer of the display panel 3, it is preferable that the wirings 51 extend from the second terminal group 52 toward the edge of the supporting member 5, particularly toward the edge of the supporting member 5 remote from the display panel 3. On the other hand, in the case where the conductor resistance of the wirings 51 is relatively large, it can be preferable for the wirings 51 to extend toward an end of the supporting member 5 which is in the vicinity of the display panel 3. In that case, it is preferable that the display panel 3 be placed at an edge part of the supporting member 5. When the supporting member 5 has a rectangular shape of the surface 5a, the display panel 3 is preferably placed at a corner portion of the surface 5a of the supporting member 5. The placement of the display panel 3 at the corner portion of the supporting member 5 is also desirable in that the display panel 3 itself cannot be easily seen by a person when no image is displayed. The route of each one of the plurality of wirings 51 is not construed to be limited to the example shown in FIG. 1. Further, the wirings 51 can be covered with a protection film formed of polyester or polyethylene terephthalate (PET).

An adhesive 81 is not construed to be particularly limited as long as it can exhibit adhesive strength sufficient to stably join the holding member 4 to the supporting member 5. An arbitrary epoxy adhesive or an acrylic adhesive is usable. Further, a film-like or paste-type acrylic, silicone, or urethane adhesive, which can be referred to as an optical clear adhesive (OCA) or an optical clear resin (OCR), is usable.

The holding member 4 is engaged with the edge of the display panel 3 and is adhered to the surface 5a of the supporting member 5 by means of the adhesive 81. The holding member 4 is provided at a part or the whole of the edge of the display panel 3. In the example shown in FIG. 1, the holding member 4 is provided along three sides of the display panel 3 having a rectangular front shape, and the holding member 4 has a front shape like a U-shape. As shown in FIGS. 1 and 2, the holding member 4 comprises a concave portion 4d on the surface (inner wall surface) facing the display panel 3 on each side of the U-shaped configuration. The edge of the display panel 3 is inserted in the concave portion 4d, and the edge of the display panel 3 and the holding member 4 are engaged with each other at the concave portion 4d. The movement of the display panel 3 is restricted by the holding member 4, in both positive and negative directions in the X direction (longitudinal direction of the display panel 3), in +Y direction of the Y direction (short side direction of the display panel 3), and in a direction departing from the supporting member 5 (+Z direction), in FIG. 1. Accordingly, the display panel 3 is held at the given position on the surface 5a of the supporting member 5 by the holding member 4. The movement of the display panel 3 in the −Y direction can be restricted by setting the +Y direction so as to coincide with the gravity direction at the time of use, and can be restricted by the holding force of the connector 2 imparted on the display panel 3 or the adhesive force of the above-mentioned weak adhesive layer (not shown).

In the example shown in FIG. 1, the holding member 4 is a frame body having a rectangular shape, as a whole, and comprises the connector 2 on an arbitrary side (the upper side in the example shown in FIG. 1) of the entire rectangular shape. Further, as mentioned above, the holding member 4 comprises a discontinuous portion at a part thereof. Although the relative positional relationship between the connector 2 and the discontinuous portion of the holding member 4 is arbitrary, a portion of the holding member 4 that is to be a side opposing one side including the connector 2 is preferably a discontinuous portion, like the example shown in FIG. 1. By providing the discontinuous portion as mentioned above, it is possible to prevent the contactors 21 and each terminal of the first terminal group 31, which are not mutually connected, from being uselessly chafed when the display panel 3 is inserted into the frame-shaped holding member 4 from the discontinuous portion and the edge of the display panel 3 is coupled with the connector 2 as described below. Accordingly, even when the display panel 3 is repetitively attached to and detached from the connector 2, it is possible to suppress each terminal of the first terminal group 31 and the contactors 21 of the connector 2 from wearing, and a proper connection state can be maintained.

Unlike the example shown in FIG. 1, the holding member 4 can be provided at the edge of only two sides or one side of the display panel 3 having a rectangular shape, and, accordingly, the holding member 4 can be formed of a linear rod-shaped material. The holding member 4 can be of any type as long as it can restrict the movement of the display panel 3 at least in one direction on the surface 5a of the supporting member 5. Further, the holding member 4 is not necessarily required to comprise the above-mentioned concave portion 4d on the inner wall surface thereof, especially on the inner wall surface of a portion (a non-connector portion 41) where the contactors 21 are not disposed. For example, the holding member 4 can comprise a stepped portion, which is to be brought into contact with an end surface and the second surface 3s of the display panel 3, on the inner wall surface thereof. Further, the inner wall surface of the non-connector portion 41 can be a flat surface having no unevenness. In that case, the movement of the display panel 3 in the direction departing from the supporting member 5 can be restricted by the frictional force acting between the display panel 3 and the inner wall surface of the non-connector portion 41.

The holding member 4 can be formed of an arbitrary material capable of holding the display panel 3. For example, a synthetic resin such as an epoxy resin or a general-purpose plastic, a natural resin such as a natural rubber, and a rubber sponge are exemplary materials of the holding member 4. From the viewpoint of the ease of engaging with the display panel 3 or the ease of placement on the supporting member 5, it is preferable that the holding member 4 be formed of a material having flexibility and/or proper elasticity. Further, from the viewpoint that it is difficult for a viewer of the display apparatus 1 to see the holding member 4, it is preferable that the holding member 4 be formed using a light-transmitting material, such as a transparent silicone rubber. However, it is preferable that a portion constituting the connector 2 in the holding member 4 be formed of a synthetic resin having proper rigidity and insulation properties since the portion can surely hold each one of the plurality of contactors 21 at a given position. Further, as described below, in the case of heating the connector 2 when the contactors 21 of the connector 2 are connected to the second terminal group 52, it is preferable to use a material that can resist heat at the temperature of at least 150 degrees Celsius. A synthetic resin such as polyamide, polyphenylene sulfide, and liquid crystal polymer is an example of a material suitable for the portion (a housing portion described below) constituting the connector 2 in the holding member 4.

Figure 5A:
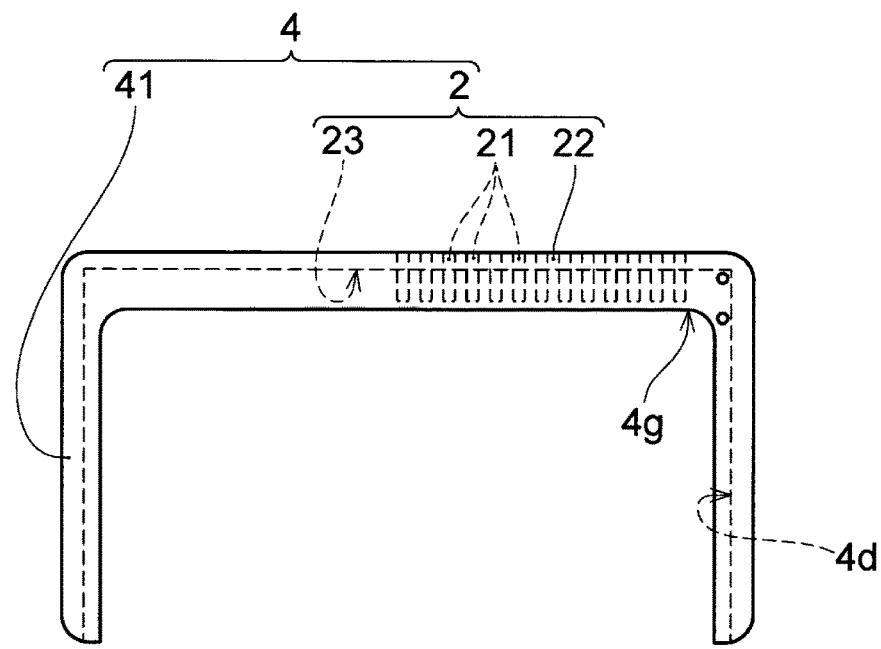
FIG. 5A shows a front view of an example of a holding member, indicated by itself, of the display apparatus according to Embodiment 1.
Figure 5B:
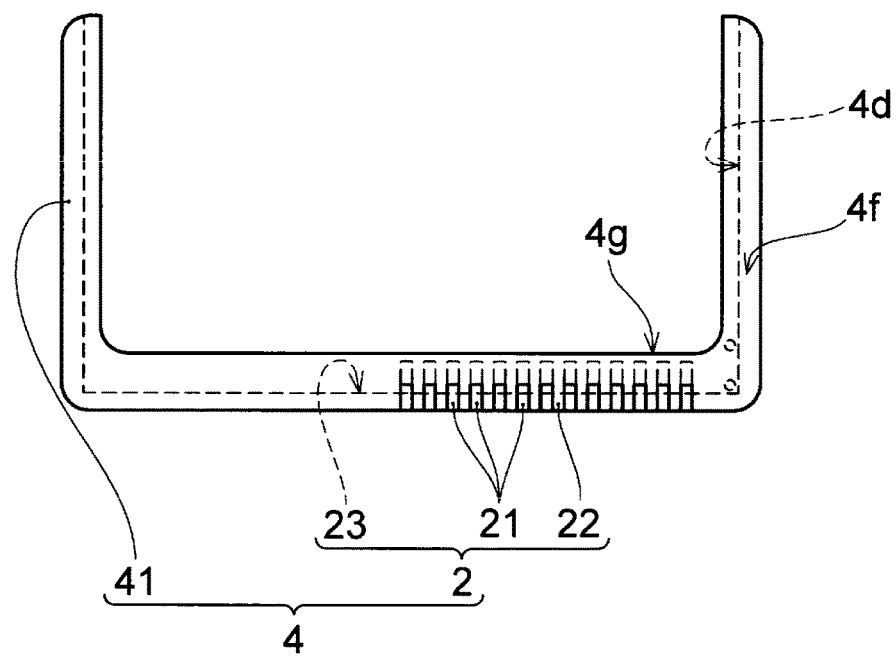
FIG. 5B shows a rear view of the holding member shown in FIG. 5A.

The holding member 4, especially the connector 2 included in the holding member 4, will be further described with reference to FIGS. 1, 4, 5A, and 5B. FIG. 5A shows a front view of the holding member 4 in FIG. 1, indicated by itself. FIG. 5B shows a rear view of the holding member 4 shown in FIG. 5A. The holding member 4 comprises the connector 2 including the plurality of contactors 21 arranged in a row and the non-connector portion 41 where the contactors 21 are not disposed. Although the boundary between the connector 2 and the non-connector portion 41 is not necessarily clear, the portion of the holding member 4 contributing to the holding of the contactors 21 and the holding of the connection state with the display panel 3 is the connector 2. Accordingly, the region occupied by the connector 2 is variable depending on the fitting property with the display panel 3. For example, in the holding member 4 shown in FIG. 5A, the entire upper side of the U-shaped configuration can constitute the connector 2, or only a part of the upper side where the plurality of contactors 21 are arrayed sequentially can constitute the connector 2.

The holding member 4 comprises a bottom surface 4f to be directed to the surface 5a of the supporting member 5, a side surface 4g to be directed to the display panel 3, and a groove 23 formed on the side surface 4g so as to constitute the connector 2. The groove 23 can be formed continuously with the above-mentioned concave portion 4d of the holding member 4. The plurality of contactors 21 are exposed inside the groove 23 and exposed at the bottom surface 4f of the holding member 4, and each of terminals constituting the second terminal group 52 is connected to each one of the plurality of contactors 21 on the bottom surface 4f of the holding member 4. Further, at least a part of the edge (the upper edge in FIG. 1) of the display panel 3 is inserted in the groove 23. More specifically, the edge of the display panel 3 at which the first terminal group 31 is positioned is inserted in the groove 23. As a result, each of terminals constituting the first terminal group 31 is connected to each one of the plurality of contactors 21 inside the groove 23, and is electrically connected to the second terminal group 52 via the contactors 21.

The connector 2 comprises a housing portion 22 that holds the plurality of contactors 21 at a predetermined pitch in a mutually insulated state and forms the groove 23. In the example shown in FIG. 4 and the like, each one of the plurality of contactors 21 is formed using a strip-shaped plate material and is press-fitted into an insertion hole formed in the housing portion 22 so as to communicate with the groove 23. The contactor 21 extends from the inside of the groove 23 to the outside of the holding member 4 through the insertion hole and further extends to the bottom surface 4f along an outer wall surface of the holding member 4.

In addition, each one of the plurality of contactors 21 is positioned along one inner wall of the groove 23 at the inside of the groove 23 and curved toward an opposing inner wall in the groove 23. In FIG. 4, since the display panel 3 is coupled to the connector 2, the contactors 21 are slightly curved. However, in a state where the display panel 3 is not coupled to the connector 2, a portion of the contactor 21 which is exposed at the groove 23 is largely curved compared to the state shown in FIG. 4. In other words, the contactor 21 formed using a plate-shaped member and being curved has a leaf spring-like shape and can have a function as a leaf spring. Accordingly, when the display panel 3 is inserted into the connector 2, the portions of the contactors 21 which are curved in the leaf spring shape and exposed inside the groove 23 are pushed by respective terminals of the first terminal group 31, and the restoring force of the contactors 21 causes the contactors 21 to push back the respective terminals of the first terminal group 31. In other words, the contactors 21 and respective terminals of the first terminal group 31 are brought into contact with each other with sufficient contact pressure. For example, even in an environment such as the vehicular compartment where vibrations can be applied, the contact state can be surely maintained and instantaneous interruption of electric conduction or the like can be prevented. Further, the required contact pressure can be considered to be maintained for a long time. It is further considered that the curved shape of the contactors 21 prevent the contactors 21 from disengaging from the housing portion 22.

Inside the groove 23, the plurality of contactors 21 is arrayed at substantially the same pitch as the array pitch of each of terminals constituting the first terminal group 31 of the display panel 3. Further, the plurality of contactors 21 is arrayed at substantially the same pitch as the array pitch of the second terminal group 52 of the supporting member 5, on the bottom surface 4f of the holding member 4. Although the array pitch of the plurality of contactors 23 can be differentiated between the inside of the groove 23 and the bottom surface 4f, it is preferable that the plurality of contactors 21 be arrayed inside the groove 23 and on the bottom surface 4f at substantially the same pitch.

The contactors 21 can be formed using an arbitrary material having required conductivity. A material having proper spring property is preferable as the material for the contactors 21, from the viewpoint that it brings about the above-mentioned leaf spring-like operation. For example, copper, copper alloys, nickel, and the like are exemplified as materials for the contactors 21 from the viewpoint of conductivity, and stainless steels and the like are exemplified from the viewpoint of the leaf spring function. From the viewpoints of rust resistance and corrosion resistance, the surface of the contactor 21 is preferably gold-plated.

Figure 6:
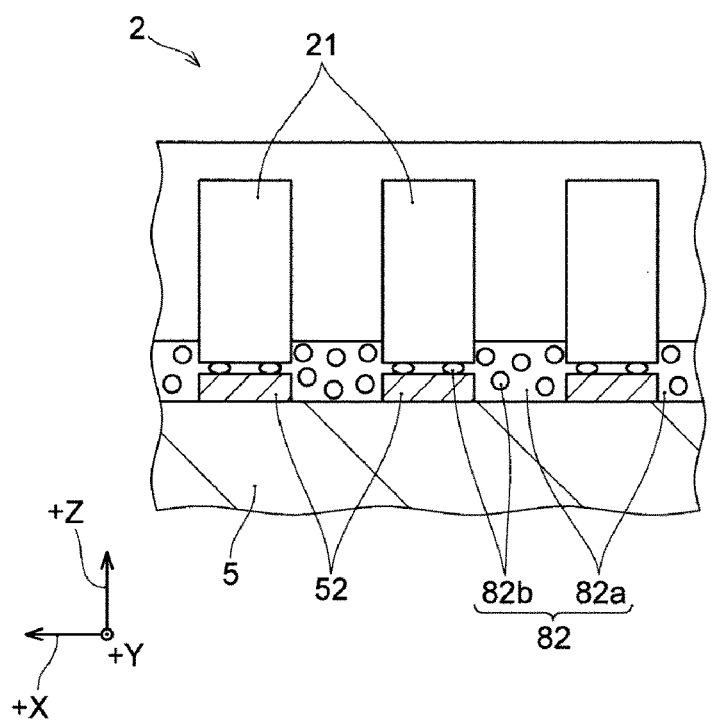
FIG. 6 shows an enlarged view of a part of a cross section along a line VI-VI in FIG. 1.

Each one of the plurality of contactors 21 that the connector 2 comprises and the second terminal group 52 can be connected to each other using an arbitrary conductive material. For example, an epoxy-based conductive adhesive, solder, or the like can be used. However, as mentioned above, the plurality of contactors 21 and each of terminals constituting the second terminal group 52 are provided at a pitch of several tens of μm. Accordingly, as shown in FIG. 6, an anisotropic conductive film (ACF) is preferably used as connecting means 82 for connecting the plurality of contactors 21 and the second terminal group 52. FIG. 6 shows an enlarged view of a connecting portion between the contactors 21 and the second terminal group 52, as a part of the cross section along a line VI-VI in FIG. 1. In FIG. 6, the covering member 7 shown in FIG. 1 is omitted for the purpose of the ease of viewing the second terminal group 52.

For example, the ACF includes a thermosetting resin portion 82a comprising an epoxy resin, a transparent acrylic resin or a transparent silicone resin and conductive particles 82b mixed into the thermosetting resin portion 82a. The thermosetting resin portion 82a, when heated and pressed, is once softened and then permanently hardened to constitute the connecting means 82 together with the conductive particles 82b. Although not shown, the conductive particle 82b comprises a metal layer made of nickel, gold, or the like so as to constitute a central part of the conductive particle 82b and an insulating layer covering the metal layer. When the ACF is heated and pressed in a state where the ACF is sandwiched between the contactors 21 and the second terminal group 52, the insulating layer is destroyed on each conductive particle 82b. The metal layers are brought into contact with each other, or the metal layer is brought into contact with the contactor 21 or each of the terminals of the second terminal group 52. Therefore, a conductive path in the Z direction shown in FIG. 6 is formed between the contactors 21 and the second terminal group 52. On the other hand, since no sufficient pressure is applied to the conductive particles 82b in the thermosetting resin portion 82a not facing the contactors 21 or each of the terminals of the second terminal group 52, the insulating layer of the conductive particles 82b can be maintained. Accordingly, the insulation property of the plurality of contactors 21 and each of the terminals of the second terminal group 52 in the X direction in FIG. 6 can be maintained. As a result, each one of the plurality of contactors 21 arrayed in a narrow pitch is electrically connected appropriately to each of the terminals of the second terminal group 52.

In the example shown in FIGS. 1 to 4, the plurality of contactors 21 of the connector 2 and the connecting portion between the contactors 21 and each of the terminals of the second terminal group 52 are exposed to the outside of the holding member 4. In the display apparatus 1 according to the present embodiment, as shown in FIGS. 1 and 4, the plurality of contactors 21 and the connecting portion between the plurality of contactors 21 and the second terminal group 52 that are exposed to the outside of the holding member 4 are covered with the covering member 7. By providing the covering member 7, it is possible to prevent a short circuit failure that can occur due to contact of the contactors 21 and the second terminal group 52 that are exposed to the outside of the holding member 4 with an external conductive material. In addition, it is also possible to prevent a short circuit failure that can occur due to dew condensation or the like. The covering member 7 is, for example, a solidified substance of an epoxy resin, an acrylic resin, a silicone resin, or the like which is supplied onto the contactors 21 and the second terminal group 52 by coating or the like. Further, the covering member 7 can be an organic film formed using an epoxy resin, an acrylic resin, or a silicone resin or an inorganic film formed using aluminum or silicon nitride.

Figure 7:
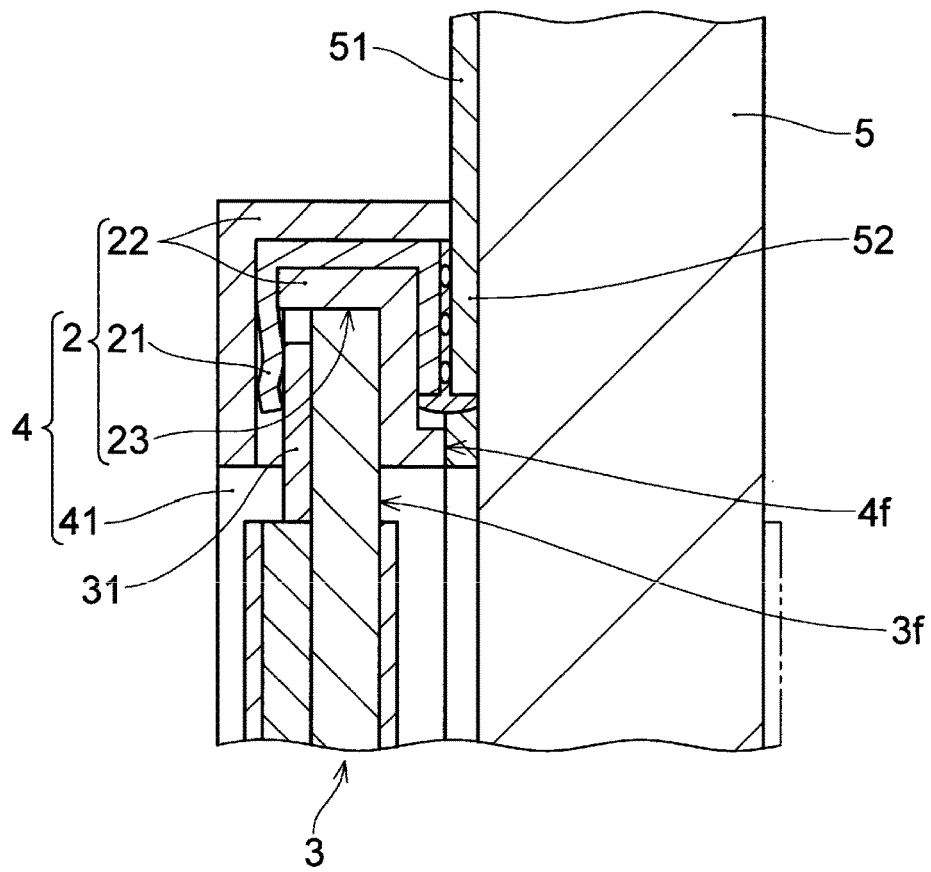
FIG. 7 shows a cross-sectional view of another example of the holding member of the display apparatus according to Embodiment 1.

FIG. 7 shows another example of the connector 2, as a cross-sectional view corresponding to FIG. 4. In the example shown in FIG. 7, the contactors 21 extend from the groove 23 toward the bottom surface 4f through inside of the housing portion 22 without being exposed to the outside of the holding member 4. Accordingly, the short circuit failure that can occur due to contact of the external conductive material with the contactor 21 can be prevented. In addition, the connecting portion between the second terminal group 52 and the contactors 21 is not exposed to the outside of the holding member 4. Accordingly, the covering member 7 shown in FIG. 4 is not provided. In a case where the second terminal group 52 is exposed to the outside of the holding member 4, although not shown, the exposed portion of the second terminal group 52 can be covered with the above-mentioned protection film that can be provided to cover the wirings 51. The connector 2 exemplified in FIG. 7 can be formed by, for example, insert molding or the like.

The structures of the connector shown in FIGS. 4 and 7 are merely examples of the connector 2 that the holding member 4 can comprise. The structure of the connector 2 is construed to be not limited to the structures shown in these drawings. For example, the contactors 21 can be positioned along the inner wall of the groove 23 which faces the first surface 3f of the display panel 3. In that case, the first terminal group 31, which is electrically connected to the driving elements 39 (see FIG. 1) via a through hole conductor (not shown), is formed on the first surface 3f of the display panel 3. Further, the contactors 21 can be branched into two groups at a part between the bottom surface 4f of the holding member 4 and the groove 23 and can be exposed along each of the inner walls of the groove 23 facing each other. In FIG. 7, constituent elements similar to those shown in FIG. 4 are denoted by the same reference numerals and duplicate descriptions are omitted.

Referring back to FIG. 2, an optical functional layer 61 having a given function with respect to light propagation is formed on the surface (the first surface 3f) of the display panel 3 to be oriented to the supporting member 5. An ultraviolet-ray absorbing layer and an infrared-ray reflective layer are examples of the optical functional layer 61. Either or both of the ultraviolet-ray absorbing layer and the infrared-ray reflective layer can be formed on the first surface 3f of the display panel 3. As described above, the supporting member 5 can be a windshield of an automobile or the like. In that case, the first surface 3f of the display panel 3 is irradiated with sunlight that passed through the supporting member 5. However, for example, by providing the infrared-ray reflective layer on the first surface 3f, temperature increase of the display panel 3 due to the irradiation with sunlight can be suppressed. Accordingly, the display panel 3 can be prevented from deteriorating. In the case where the optical functional layer 61 comprises the infrared-ray reflective layer, the optical functional layer 61 can comprise a multilayered body composed of alternately deposited materials having mutually different refractive indices. The multilayers composed of materials having mutually different refractive indices, such as titanium oxide ($TiO_2$) and silicon dioxide ($SiO_2$), or zinc sulfide (ZnS) and magnesium fluoride ($MgF_2$), are formed to have a thickness capable of enhancing the reflected light in an infrared region at the interface of each layer.

Further, in the case where the display panel 3 is the organic-EL display panel, organic elements (not shown) in the display panel 3 can be subjected to stress due to ultraviolet-ray contained in sunlight. However, by providing the ultraviolet-ray absorbing layer as the optical functional layer 61, the stress due to the ultraviolet-ray that is imparted on the organic elements can be reduced. The ultraviolet-ray absorbing layer is formed of a resin, such as a polycarbonate resin or an acrylic resin, to which an ultraviolet-ray absorbing agent is added. As the ultraviolet-ray absorbing agents, a benzophenone derivative, a salicylate ester derivative, a triazole derivative, an acrylic derivative, or the like are exemplified.

As indicated by an alternate chain double-dashed line in FIG. 2, an optical functional layer 61a comprising an infrared-ray reflective layer and/or an ultraviolet-ray absorbing layer can be provided on a surface of the supporting member 5 that is opposite the surface 5a. When the optical functional layer 61a is provided at the supporting member 5, the optical functional layer 61a can be used continuously even when a defect or the like occurs and the display panel 3 is replaced. On the other hand, when the optical functional layer 61 is provided at the display panel 3, the optical functional layer 61 can also be replaced together with the display panel 3 in the case of functional deterioration of the optical functional layer 61 progressing according to temporal deterioration of the display panel 3. The optical functional layers 61 and 61a can be provided at the display panel 3 and the supporting member 5, respectively.

In the example shown in FIG. 2, a protection film 62 against a mechanical stress is further formed on the surface of the pixel forming region 3c of the display panel 3. The surface of the pixel forming region 3c is exposed toward a viewer of the display apparatus 1 and therefore tends to be subjected to a mechanical stress due to collision of a foreign object or wiping operation at the time of contaminations. The protection film 62 protects the display panel 3, particularly pixels in the pixel forming region 3c, against such a mechanical stress. As the protection film 62, an inorganic film such as an $SiO_2$ film or a fluorine film, and an organic resin film formed of polyester or polyethylene terephthalate (PET).

Figure 8:
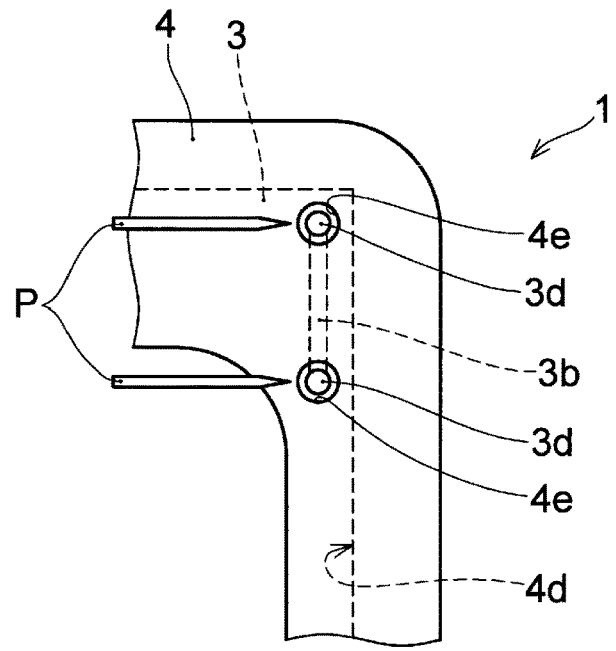
FIG. 8 shows an enlarged view of surroundings of identifiers of the display apparatus shown in FIG. 1.

Referring back to FIG. 1, the display apparatus 1 comprises identifiers 3d at the display panel 3, which ensure coupling of the display panel 3 with the connector 2 (see FIG. 3). In the example shown in FIG. 1, the display panel 3 is inserted into the holding member 4 from the discontinuous portion of the U-shaped holding member 4 and is coupled to the connector 2. Whether the coupling has been appropriately performed can be verified using the identifiers 3d. In FIG. 8 is shown an enlarged view of the surroundings of the identifiers 3d, together with two probes P to be used to verify the suitability in connection of the connector 2 and the display panel 3. As shown in FIG. 8, the display panel 3 comprises the identifiers 3d exposed at the edge at which the holding member 4 is provided. The identifier 3d is a portion having a given area and is different from the surroundings thereof in appearance features or electrical characteristics. For example, the identifier 3d is a conductive pad provided in a region having insulation property on the second surface 3s (see FIG. 2) of the display panel 3. Further, the identifier 3d can be a marking which is provided on the second surface 3s of the display panel 3 and differentiated in color from the surroundings thereof. The shape of the identifier 3d is construed to be not limited to a circular shape shown in FIG. 8. In the example shown in FIG. 8, the identifiers 3d comprise two conductive pads. Two conductive pads are electrically connected to each other via a conductor pattern 3b provided at the display panel 3 in a manner similar to the identifiers 3d.

On the other hand, the holding member 4 comprises the concave portion 4d, as mentioned above. The edge of the display panel 3, at which the identifiers 3d are provided, is inserted into the concave portion 4d. The holding member 4 further comprises apertures 4e communicating with the inside of the concave portion 4d. The apertures 4e are provided at positions corresponding to the identifiers 3d of the display panel 3. In other words, the holding member 4 comprises the apertures 4e at portions where the identifiers 3d are exposed when the edge of the display panel 3 is appropriately coupled to the connector 2. In the example shown in FIG. 8, two apertures 4e corresponding to two identifiers 3d are provided. By providing the identifiers 3d and the apertures 4e as mentioned above, it is possible to verify whether the display panel 3 is appropriately coupled with the connector 2.

For example, when coupling the display panel 3 with the connector 2, as shown in FIG. 8, two probes P are inserted into the apertures 4e so as to come into contact with the display panel 3 and conductivity between the two probes is tested. When the display panel 3 is appropriately coupled to the connector 2, since the two probes P become conductive upon coming into contact with the conductive identifiers 3d respectively, suitability of the coupling can be verified.

When the identifiers 3d are differentiated from the surroundings thereof in appearance features such as colors, by checking whether the appearance features of the identifiers 3d are exposed to the inside of the apertures 4e, the suitability of the connection can be also verified. From the viewpoint of ease of detecting an inappropriate state even when the display panel 3 is inserted into the connector 2 in a manner inclined relative to a normal coupling direction, it is preferable that at least two identifiers 3d and at least two apertures 4e be provided as exemplified in FIG. 8. However, only one identifier 3d and only one aperture 4e can be provided. For example, even when only one conductive pad is provided as the identifier 3d, whether the coupling is suitable can be considered to be determined for most of coupling as long as an area in which at least two probes P can be brought into contact with each other is secured.

Figure 9:
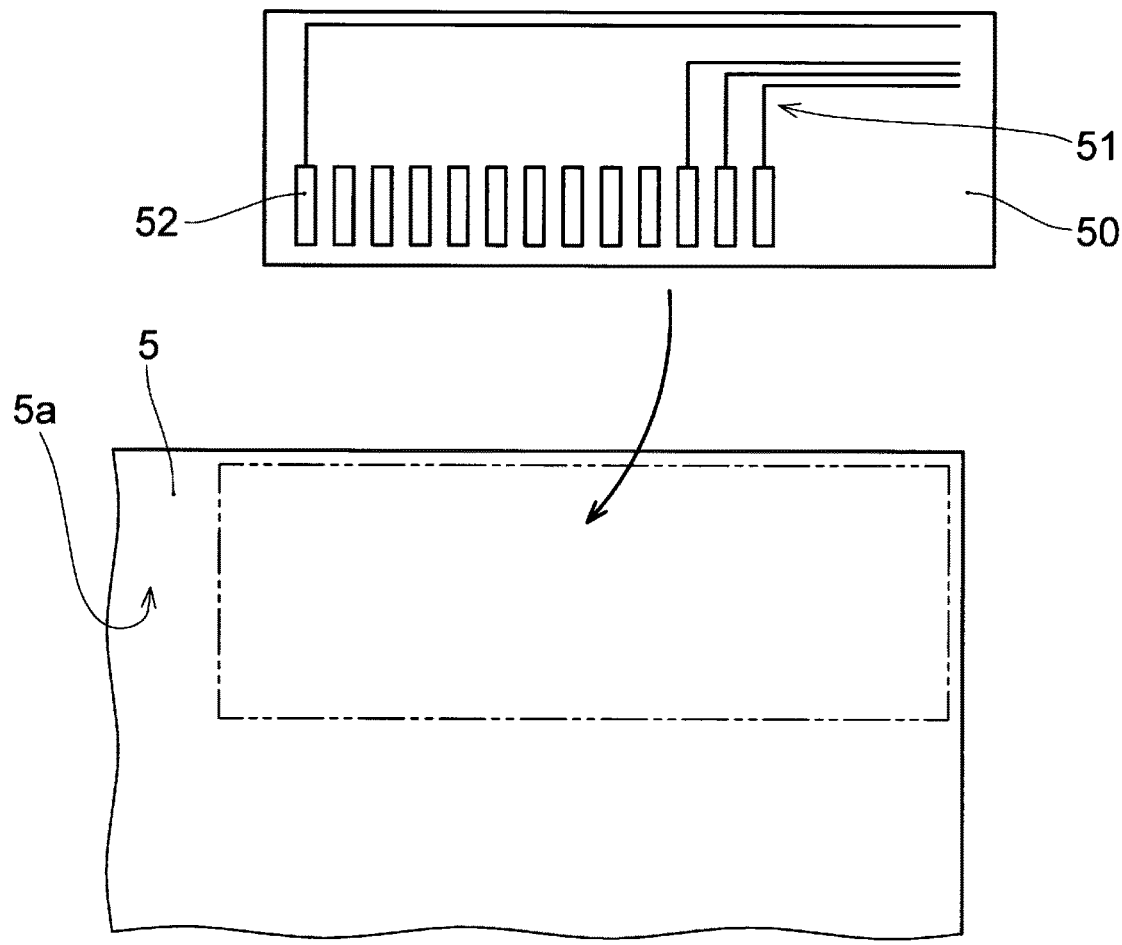
FIG. 9 shows a view of an example of wiring that is formed on a base material separate from the supporting member in the display apparatus according to Embodiment 1.

In the example shown in FIGS. 1 to 4, the wirings 51 and the second terminal group 52 are directly formed on the surface 5a of the supporting member 5. However, as mentioned above, the supporting member 5 can comprise a very large member, such as a window glass of an automobile, compared to the display panel 3. In that case, it is not necessarily easy to form the wirings 51 and the like on the supporting member 5 having such a large size. Accordingly, the wirings 51 and the second terminal group 52 can be formed on the base material 50 separate from the supporting member 5 as shown in FIG. 9 and the base material 50 can be adhered to the surface 5a of the supporting member 5. Forming the wirings 51 and the like by doing so can be sometimes easier than forming them on the supporting member 5. The wirings 51 and the second terminal group 52 are, for example, formed by patterning a metal foil made of copper or the like that is laminated on the base material 50 by etching or the like. The wirings 51 and the like can be also formed by performing electroless plating, sputtering, vapor deposition, or the like after appropriately masking the base material 50.

The base material 50 is a plate-like body or a filmy body formed using an arbitrary insulating material and can be, for example, a substrate formed mainly of an epoxy resin, or a polyimide film. In the case where the supporting member 5 is a glass plate such as a windshield of an automobile, it is preferable that the base material 50 be a transparent polyimide film so as to maintain light transmissivity. The base material 50 is adhered to the supporting member 5 using, for example, an adhesive. Although an arbitrary adhesive can be used as this adhesive, it is preferable to use the above-mentioned OCA as the adhesive when the supporting member 5 and the base material 50 have light transmissivity.

In the example shown in FIGS. 1 to 4, the display panel 3 comprises the pixel forming region 3c on the surface (the second surface 3s) to be directed to a viewer of the display apparatus 1. In other words, in the case where the display panel 3 is an organic-EL display apparatus, the display panel 3 exemplified in these drawings is a top emission type organic-EL display panel. However, the display panel 3 can be configured as a bottom emission type organic-EL display panel, and an example thereof is shown in FIG. 10 as a bottom view in a manner similar to FIG. 2.

Figure 10:
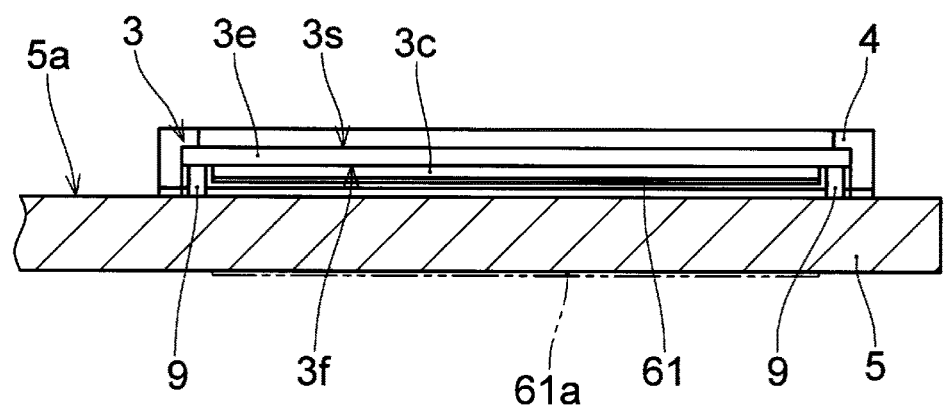
FIG. 10 shows a bottom view of another example of the display apparatus according to Embodiment 1, viewed from below in FIG. 1.

As shown in FIG. 10, the display panel 3 comprises the pixel forming region 3c on the surface (the first surface 3f) to be directed to the supporting member 5. In addition, the optical functional layer 61 is formed on the first surface 3f (more specifically, the surface of the pixel forming region 3c). As the optical functional layer 61 shown in FIG. 10, for example, either or both an ultraviolet-ray absorbing layer and an infrared-ray reflective layer can be formed, similar to the optical functional layer 61 described previously with reference to FIG. 2. In the example shown in FIG. 10, the pixel forming region 3c faces the supporting member 5.

Accordingly, in the case where the supporting member 5 is a windshield of an automobile or the like, the organic elements (not shown) in the pixel forming region 3c are irradiated with sunlight including ultraviolet-rays and infrared-rays not passing through a substrate 3e constituting the display panel 3, unlike the example shown in FIG. 2. Therefore, it is particularly useful to provide the optical functional layer 61 on the first surface 3f of the display panel 3 in the example shown in FIG. 10. In the case where the display panel 3 is the bottom emission type organic-EL display panel exemplified in FIG. 10, the optical functional layer 61a can be formed on the supporting member 5 in addition to the optical functional layer 61 provided on the first surface 3f of the display panel 3, or instead of the optical functional layer 61. Further, although not shown, a protection film against a mechanical stress can be formed on the second surface 3s of the display panel 3.

In the example shown in FIG. 10, the display panel 3 comprises a stepped portion caused by the pixel forming region 3c on the surface (the first surface 3f) to be directed to the supporting member 5. In the example shown in FIG. 10, an auxiliary member 9 having a thickness corresponding to a height of the stepped portion is provided around the pixel forming region 3c between the supporting member 5 and the display panel 3. The display panel 3 is stably held on the surface 5a of the supporting member 5 by virtue of the auxiliary member 9. Further, the second surface 3s of the display panel 3 from which light is emitted can be positioned substantially parallel to the surface 5a of the supporting member 5.

The auxiliary member 9 can be provided continuously along the entire periphery of the pixel forming region 3c, or can be provided discontinuously in a belt like shape along each of sides of the pixel forming region 3c having a rectangular front shape. Alternatively, an arbitrary number of auxiliary members 9, each having a columnar shape, can be regularly or randomly positioned around the pixel forming region 3c. The thickness of the auxiliary member 9 can be a thickness substantially corresponding to the height of the stepped portion caused by the pixel forming region 3c, or can be greater than the thickness corresponding to the stepped portion. Although the auxiliary member 9 can be formed of an arbitrary material, the auxiliary member 9 is preferably formed of the same material as the material forming the holding member 4, at least a material having substantially the same thermal expansion coefficient. By doing so, the stress that can be applied to the display panel 3 when the ambient temperature changes can be reduced.

Although not shown, since deterioration of display elements constituting the display panel 3, particularly organic elements forming a light-emitting layer in the organic-EL display panel, tends to easily progress due to contact with moisture, means for preventing penetration of moisture into a space between the display panel 3 and supporting member 5 can be further provided in the display apparatus 1. For example, a gap between the display panel 3 and the holding member 4 can be covered with a resinous solidified, an organic film, or an inorganic film, similar to the above-mentioned covering member 7. Similarly, a gap between the edge (the lower edge in FIG. 1) of the display panel 3 not engaging with the holding member 4, and the supporting member 5 can be covered with a resinous solidified, an organic film, or an inorganic film. Even when a gap between the display panel 3 and the holding member 4 or a gap between the display panel 3 and the supporting member 5 is covered in this manner, since only the peripheral edge part of the display panel 3 is only covered, it is possible to remove the display panel 3 from the supporting member 5 as needed according to a method for dissolving the covering material using an appropriate solvent. The display panel 3 can be easily removed from the supporting member 5, at least compared to a case where the display panel 3 is entirely adhered to the supporting member 5.

In this manner, by covering the gap between the display panel 3 and the holding member 4 and the gap between the display panel and the supporting member 5, the space between the display panel 3 and the supporting member 5 can be substantially sealed. However, the air existing, before the sealing, between the display panel 3 and the supporting member 5 also contains moisture. In order to prevent the first surface 3f of the display panel 3 from being exposed to the moisture, the holding member 4 can be provided with a through hole communicating with the space between the display panel 3 and the supporting member 5 from the outside of the display apparatus 1 and further a closure member to close the through hole can be provided. In that case, after the space between the display panel 3 and the supporting member 5 is substantially sealed, the air is sucked out of the space via the through hole, whereby the moisture in the space is reduced. By doing so, deterioration of the display panel 3 can be suppressed. The closure member is, for example, a rubber plug that is formed of various types of rubber such as a natural rubber, a silicone rubber, or a synthetic rubber such as a butadiene rubber, the rubber plug comprising a ventilation passage normally closed by press-fitting the rubber plug into the through hole. When air is discharged, a thin tube material such as a hollow needle is inserted into the ventilation passage and the air is discharged using a pump or the like. The closure member can be a check valve which is positioned inside the through hole and closes the through hole by abutting the stepped portion provided at the inner wall of the through hole.

Figure 11:
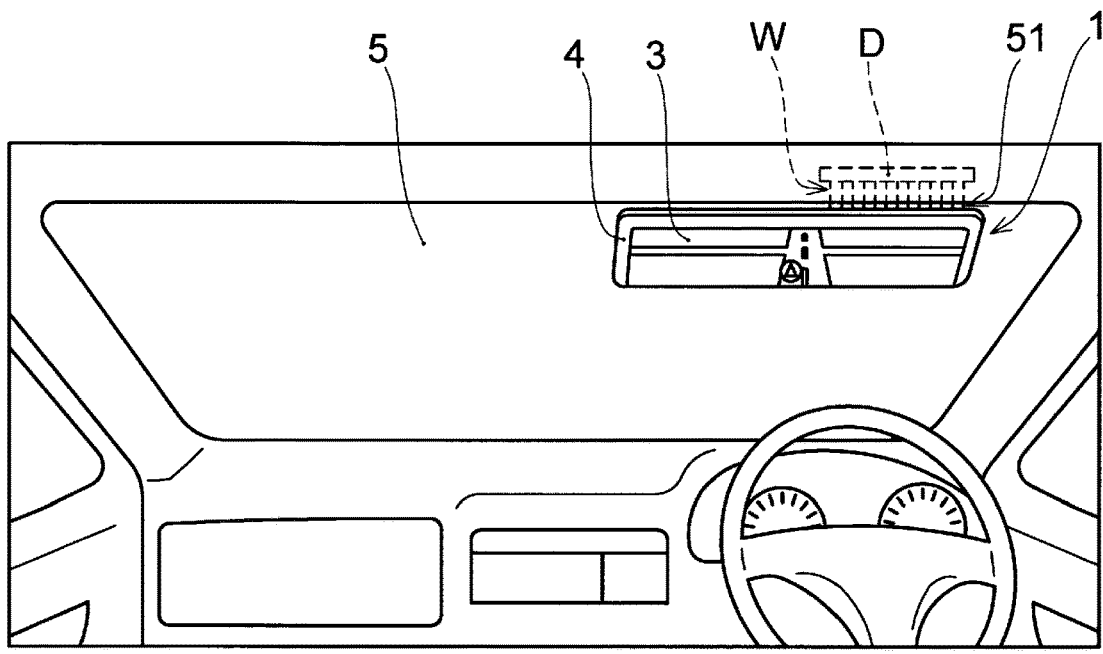
FIG. 11 shows a view of an example of the display apparatus according to Embodiment 1, in which a windshield of an automobile constitutes the supporting member.

FIG. 11 shows an example of the present embodiment where the supporting member 5 is a windshield of an automobile. In other words, the display panel 3 is held by the holding member 4 on a surface, facing the vehicular compartment, of the windshield that serves as the supporting member 5. An image by a navigation system is displayed on the display panel 3. The display panel 3 can be held at an arbitrary position on the windshield serving as the supporting member 5. For example, the display panel 3 having a lateral width corresponding to the entire width of the windshield can be held in the vicinity of an upper edge or a lower edge of the windshield entirely in the vehicle width direction. In the case of the vicinity of the upper edge, the display panel 3 is desirably held within an area to be the upper 20% region of the projection image of the windshield projected onto the plane orthogonal to the back-and-forth direction of the automobile, as mentioned above. In the case of the vicinity of the lower edge, the display panel 3 is preferably held in a region within 150 mm from the lower edge. By doing so, the forward field of vision can be sufficiently secured, and it is possible to contribute to safe navigation.

In the example shown in FIG. 11, the wirings 51 formed on the windshield (the supporting member 5) extend toward the upper edge of the windshield without passing through any curved portion. A driver D to generate a driving signal is positioned between the upholstery material at the ceiling part of the vehicular compartment and the roof of the automobile. The wirings 51 are connected, at the upper edge of the windshield, to conductive wires W connected to the driver D. In the case where the display apparatus 1 is provided in the vehicular compartment of an automobile in this manner, the wirings 51 connecting the display panel 3 and the driver D can be positioned in a state where the wirings 51 do not fluctuate due to vibration of the automobile and, further, along the windshield surface. It is considered that a neat impression be given to a person in the vehicular compartment.

Figure 12:
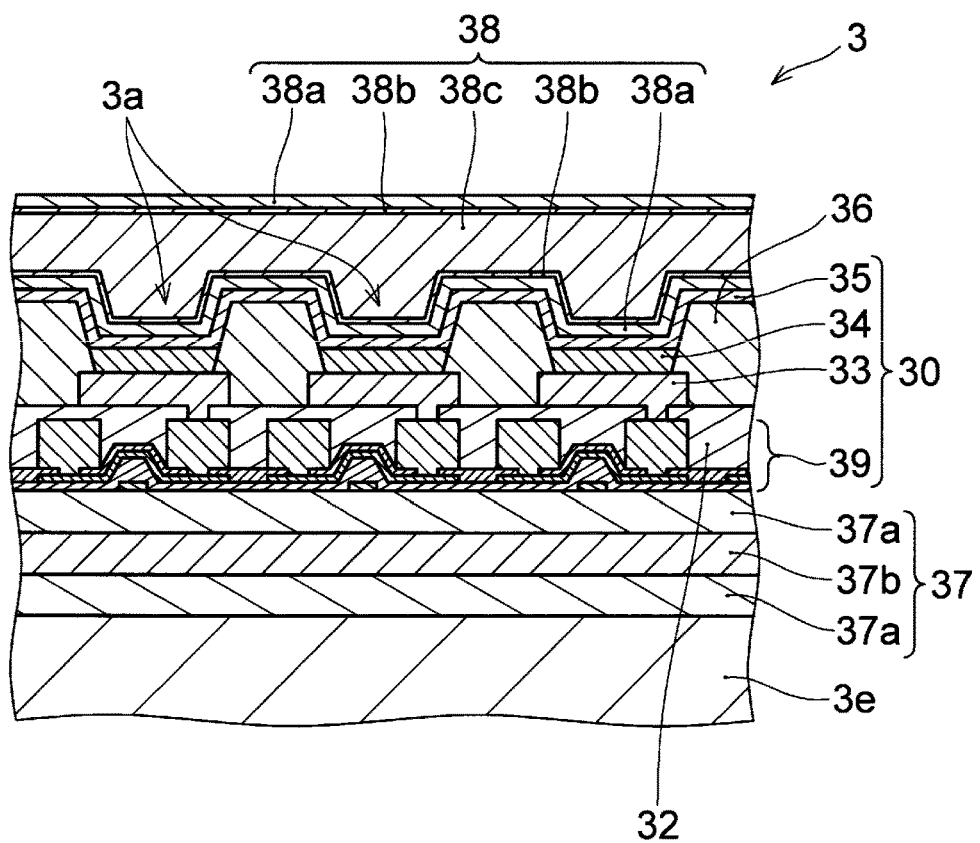
FIG. 12 schematically shows an enlarged cross-sectional view of an exemplary structure of a display panel used for the display apparatus according to Embodiment 1.

FIG. 12 shows an exemplary cross-sectional structure of the top emission type organic-EL display panel, which can be used as the display panel 3 in the present embodiment. As shown in FIG. 12, the display panel 3 comprises a substrate 3e and a plurality of display elements 30 formed on the substrate 3e. The substrate 3e is, for example, a resin film formed using a polyimide resin, preferably a transparent polyimide resin, or a glass plate. Each display element 30 comprises a thin film transistor (TFT) functioning as the above-mentioned driving element 39, a first electrode 33 connected to the TFT, an organic layer 34 formed of an organic material vapor-deposited on the first electrode 33 so as to emit light, and a second electrode 35 formed on the organic layer 34. Each display element 30 is separated by a bank 36 formed using $SiO_2$ or the like. The first electrode 33 and the bank 36 are formed on a flattening layer 32 covering the TFT. Since the TFT, the first and second electrodes 33 and 35, the organic layer 34, the bank 36, and the flattening layer 32 can have common structures and common materials for them, detailed description thereof will be omitted.

In the example shown in FIG. 12, the display panel 3 comprises a first barrier layer 37 between the display element 30 and the substrate 3e, and a second barrier layer 38 on the display element 30. The first barrier layer 37 and the second barrier layer 38 are formed using a moisture impermeable material. The water vapor transmission rate of the first barrier layer 37 and the second barrier layer 38 is, for example, equal to or less than $1\times10^{-4}$ $g/m^2/day$. In the example shown in FIG. 12, the first barrier layer 37 is a multilayered layer comprising two silicon nitride layers 37a, and a silicon oxide layer 37b sandwiched between the two silicon nitride layers 37a. Further, the second barrier layer 38 has a five-layer structure comprising two silicon nitride layers 38a, two silicon oxide layers 38b, and an organic layer 38c. The organic layer 38c is formed using, for example, an epoxy resin or the like. The silicon oxide layers 38b and the organic layer 38c are not necessarily formed, and, instead of the silicon nitride layer 38a, a silicon nitride oxide layer having a high film-forming rate can be provided. Each of the first and second barrier layers 37 and 38 can be constituted as a single-layer, or can be a multi-layered layer that is different from the example shown in FIG. 12 in the number of layers, or can be formed using a material other than silicon nitride or silicon oxide.

Although not shown, the display panel 3 can be the liquid crystal display panel, as mentioned above. The liquid crystal display panel used as the display panel 3 in the display apparatus 1 can have structure and material of a common liquid crystal display panel including pixel electrodes and counter electrodes, alignment films, polarizing plates, liquid crystal layers and the like, and therefore detailed description thereof will be omitted.

[Method for Manufacturing Display Apparatus]

Figure 13:
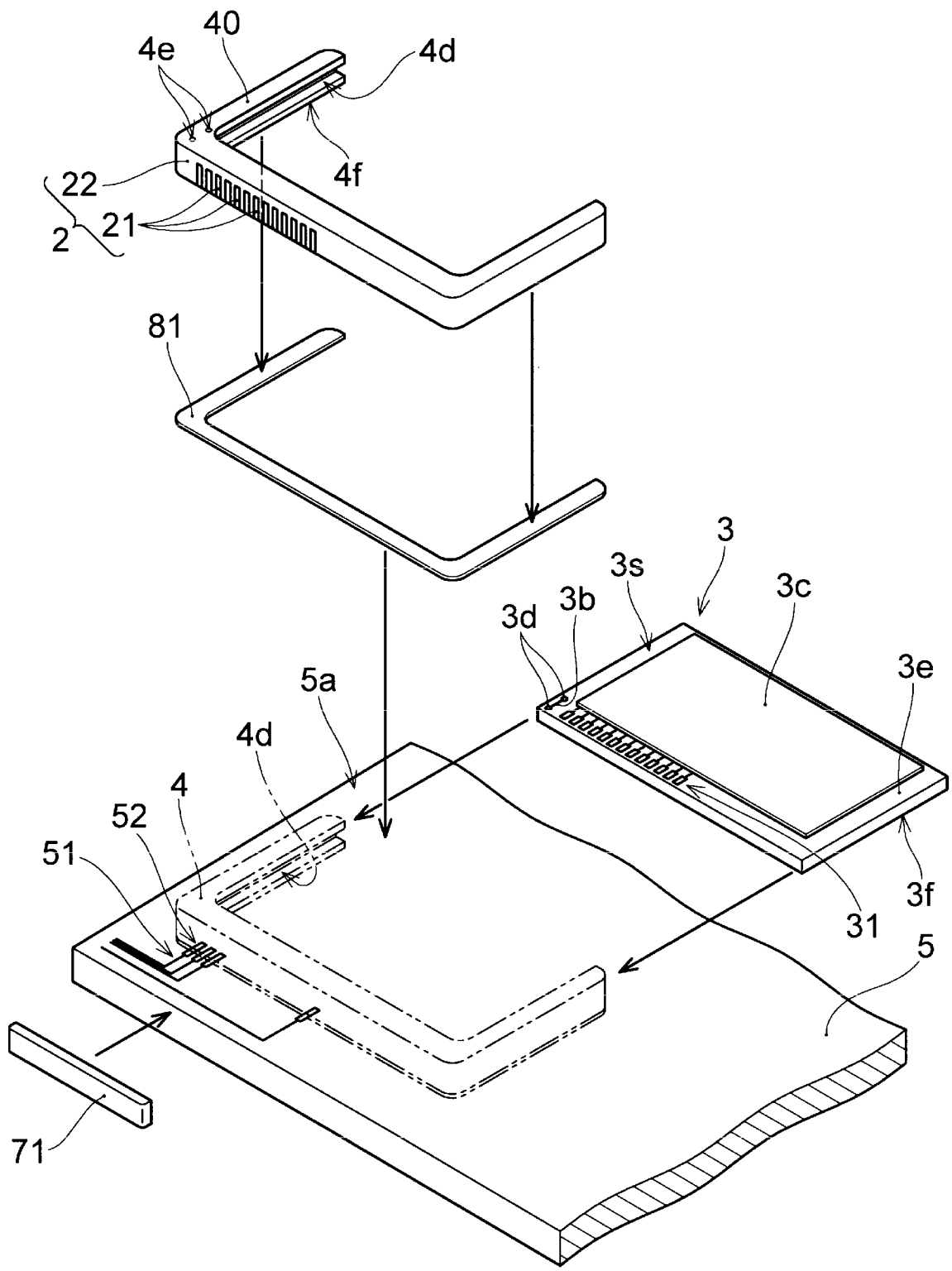
FIG. 13 shows a view of an example of a method for manufacturing display apparatus according to Embodiment 2 of the present invention.

Next, a method for manufacturing display apparatus according to Embodiment 2 will be described with reference to attached drawings. FIG. 13 schematically shows a method for manufacturing display apparatus according to the present embodiment, taking the above-mentioned display apparatus 1, as an example, shown in FIGS. 1 to 4 referenced to in the explanation described above. The method for manufacturing display apparatus according to the present embodiment comprises forming the display panel 3 comprising the pixels 3a (see FIG. 1), the plurality of driving elements 39 (see FIG. 1) to drive the pixels 3a, and the first terminal group 31 electrically connected to the plurality of driving elements 39, and forming the plurality of wirings 51 and the second terminal group 52 connected to the plurality of wirings 51 on the surface 5a of the supporting member 5. The supporting member comprises the surface 5a on which the display panel 3 is to be placed. The method for manufacturing display apparatus according to the present embodiment further comprises forming the connector 2 at a part of the rod-shaped material 40 having a linear or curved shape (the curved portion in the example shown in FIG. 13) by arranging the plurality of contactors 21 on the rod-shaped material 40 in a layout corresponding to a layout of each of terminals constituting the first terminal group 31, and providing the holding member 4 to hold the display panel 3 on the surface 5a by adhering the rod-shaped material 40 to the surface 5a of the supporting member 5. The method for manufacturing display apparatus according to the present embodiment further comprises connecting each of terminals constituting the second terminal group 52 and each one of the plurality of contactors 21, connecting each of terminals constituting the first terminal group 31 to each one of the plurality of contactors 21 by coupling at least a part of the edge of the display panel 3 with the connector 2, and placing the display panel 3 on the surface 5a of the supporting member 5. Next, the method will be described in more detail below.

First, formation of the display panel 3 will be described with reference to FIGS. 12 and 13. For example, an organic-EL display panel, a liquid crystal display panel, or the like is formed as the display panel 3. In the case where the organic-EL display panel is formed as the display panel 3, for example, the substrate 3e comprising a polyimide film, a glass plate, or the like is prepared and the first terminal group 31 comprising a plurality of connecting terminals is formed on an edge of the substrate 3e. The first terminal group 31 can be formed on either the surface (the first surface 3f) of the display panel 3 to be directed to the supporting member 5 or the surface (the second surface 3s) opposite the first surface 3f as mentioned above. In the case where the first terminal group 31 is formed on a surface different from a surface on which the driving elements 39 are formed, a through hole conductor (not shown) penetrating the substrate 3e and connecting the first terminal group 31 and the driving elements 39 is formed in addition to the formation of the first terminal group 31.

The first terminal group 31 can be formed, for example, after forming a mask layer comprising an appropriate aperture on the first surface 3f or the second surface 3s, using a material such as copper or nickel according to a sputtering method, a vapor-deposition method, a plating method, or the like. Preferably, a gold coating layer is further formed on the surface of the first terminal group 31 by plating or the like. In the case of forming the through hole conductor (not shown), a through hole is formed on the substrate 3e by etching combined with photolithography, irradiation with a $CO_2$ laser beam or a YAG laser beam, or the like and the through hole is filled with copper, nickel, or the like according to the sputtering method, a vapor-deposition method, the plating method, or the like.

Further, a plurality of TFTs functioning as the driving elements 39 and organic-EL display elements (the display elements 30) comprising the organic layer 34 and the like are formed on the substrate 3e. The TFT is formed in such a manner that at least a gate terminal thereof is electrically connected to any one of terminals constituting the first terminal group 31. The organic layer 34 is formed on the first electrode 33 surrounded by the bank 36. Further, by forming the second electrodes 35 on the organic layer 34, the plurality of pixels 3a are formed. Further, preferably, between the substrate 3e and the display element 30, the first barrier layer 37 (the silicon oxide layer 37b, and the silicon nitride layers 37a provided on upper side and lower side of the silicon oxide layer 37b, in the example shown in FIG. 12) is formed using a moisture impermeable material. The silicon nitride layers 37a and the silicon oxide layers 37b are formed according to, for example, a plasma-enhanced chemical vapor deposition (PECVD) method, the sputtering method, or the like.

After the display elements 30 are formed, preferably, the second barrier layer 38 is formed using a moisture impermeable material on the display elements 30. In the example shown in FIG. 12, the silicon nitride layer 38a, the silicon oxide layer 38b, and the organic layer 38c are formed in order on the display elements 30. Additionally, the silicon oxide layer 38b and the silicon nitride layer 38a are formed. The silicon nitride layers 38a and the silicon oxide layers 38b are formed according to, for example, the PECVD method, the sputtering method, or the like. The organic layer 38c is formed by printing an acrylic resin or an epoxy resin, for example, using an inkjet printer.

Since the TFT constituting the driving element 39, the first and second electrodes 33 and 35, and the organic layer 34 can be formed according to an arbitrary method including a well-known method, detailed description thereof will be omitted. Further, in the case of forming the liquid crystal display panel as the display panel 3, each electrode, alignment films, polarizing plates, and liquid crystal layer, which constitute liquid crystal display elements, can be formed according to an arbitrary method including a well-known method. Accordingly, detailed description thereof will be omitted.

When the display panel 3 is formed, the above-mentioned identifiers 3d are preferably provided so as to be exposed at the edge of the display panel 3 on a surface (the second surface 3s) of the display panel 3 that is opposite a surface to be directed to the supporting member 5. It is preferable that the identifiers 3d be provided at least at two locations or more. The identifiers 3d are formed by differentiating their appearance features or electrical characteristics from the surroundings thereof. For example, conductive pads can be formed as the identifiers 3d on the second surface 3s of the display panel 3 having insulation property. In this case, as shown in FIG. 13, at least two conductive pads electrically connected to each other with the conductor pattern 3b can be formed as the identifiers 3d. Further, the identifiers 3d can be provided by differentiating the color of portions where the identifiers 3d are provided from color of the periphery by coating ink of an arbitrary color.

The formation of the display panel 3 can be performed on a dummy plate (not shown) constituted by a glass plate or the like, and the completed display panel 3 can be subsequently separated from the dummy plate. Then, a reinforcing film (not shown) constituted by a copper foil, a PET film, or the like can be pasted to the surface of the display panel 3 that is peeled off the dummy plate. In that case, the optical functional layer 61 shown in FIG. 2 referred to previously is preferably formed before pasting the reinforcing film.

For example, an optical functional film having an infra-red-ray reflective function or an ultraviolet-ray absorbing function can be prepared as the optical functional layer 61, and this film can be adhered to the display panel 3 using an optically clear adhesive such as the above-mentioned OCA. However, the optical functional layer 61 can be directly formed on the display panel 3. For example, sputtering method, vacuum deposition method, PECVD method, or the like can be used. Preferably, by depositing the above-mentioned multi-layer film comprising magnesium fluoride or the like using any one of the above-mentioned methods, the optical functional layer 61 can be formed. The optical functional layer 61 exemplified in FIG. 10, referred to previously, can be formed using the sputtering method, the vacuum deposition method, the PECVD method, or the like in an arbitrary process before the display panel 3 is placed on the surface 5a of the supporting member 5.

Further, the protection film 62 exemplified in FIG. 2 is preferably formed before the display panel 3 is placed on the supporting member 5 at an arbitrary timing after the display elements 30 are formed. The formation of the protection film 62 is performed by, for example, coating of a fluororesin, or formation of a film comprising $SiO_2$ by PECVD, coating, sputtering, or the like. The protection film 62 can be formed by adhering a separately formed film.

The supporting member 5 comprising the surface 5a on which the display panel 3 is to be placed is prepared, and the wirings 51 and the second terminal group 52 are formed on the surface 5a. Arbitrary materials such as glass, a metal, and a synthetic resin can be used for the supporting member 5. The supporting member 5 can be prepared by processing the above-mentioned materials according to an arbitrary method, or an existing article can be provided as the supporting member 5. As mentioned above, for example, a glass plate that can be used as a casing applicable to various devices, a windowpane of a residence, a display case, or the like, or a windshield of an automobile or the like can be provided as the supporting member 5.

For example, the wirings 51 and the second terminal group 52 are formed by screen printing using a conductive paste containing silver or the like and subsequently baking in an atmosphere of approximately 100 degrees Celsius to 200 degrees Celsius for approximately 5 to 15 minutes, and drying or by sputtering or vapor-deposition using copper, titanium, aluminum, ITO, IZO, or the like. Preferably, the wirings 51 and a base layer of the second terminal group 52 are simultaneously and integrally formed, and a gold coating layer is formed by plating on (the surface of) the base layer of the second terminal group 52. Further, on the separate base material 50 shown in FIG. 9, referred to previously, the wirings 51 are formed by, electroless plating, or etching of a metal foil, or the like and the base material 50 can be adhered to the supporting member 5 preferably using, for example, OCA.

Although not shown in FIG. 13, the optical functional layer 61a indicated by the chain double-dashed line in FIG. 2, referred to previously, can be formed in preparing the supporting member 5 or after the formation of the wirings 51 and the like, or can be formed after the placement of the display panel 3 on the supporting member 5. The optical functional layer 61a can be formed, for example, by the same method as the formation method of the optical functional layer 61 described previously.

The rod-shaped material 40 having a linear or curved shape is prepared using a material such as a synthetic resin or a natural resin by performing molding or stamping using an appropriately fabricated die, or machining of materials, or the like. The rod-shaped material 40 is preferably provided with the concave portion 4d, the above-mentioned groove 23 (see FIG. 4), and a plurality of insertion holes (not shown)

into which the contactors 21 are press-fitted. The plurality of insertion holes is formed in an arrangement corresponding to the terminals of the first terminal group 31 and the terminals of the second terminal group 52. In the case where the identifiers 3*d* are provided at the display panel 3 as shown in FIG. 13, the rod-shaped material 40 is further provided with the apertures 4*e* communicating with the inside of the concave portion 4*d* at positions where the identifiers 3*d* are exposed when the edge of the display panel 3 is appropriately coupled with the connector 2. Further, by performing punching and folding using an appropriate die on a copper plate, a copper alloy plate, a stainless steel plate, or the like, the plurality of contactors 21 having a plate-like shape, preferably a shape curved like a leaf spring, are prepared. Then, for example, the plurality of contactors 21 are press-fitted into the plurality of insertion holes provided in the rod-shaped material 40, and thereby, the connector 2 is formed so as to comprise the plurality of contactors 21, the housing portion 22 for holding the plurality of contactors 21, and the groove 23. The connector 2 can be formed by a method other than the press-fitting of the contactors 21, such as insert molding to be performed in a state where the plural contactors 21 are arranged in parallel with each other in an appropriate molding die.

Then, the holding member 4 is provided by adhering the rod-shaped material 40 to the surface 5*a* of the supporting member 5. In the example shown in FIG. 13, the holding member 4 has a frame-like planar shape, as a whole, including the connector 2 on one side of the planar shape and specifically has the U-shaped configuration having a discontinuous portion at a side opposite one side including the connector 2. The U-shaped holding member 4 is disposed at a position surrounding a proper placement position of the display panel 3. Further, the rod-shaped material 40 is positioned in such a manner that each one of the plurality of contactors 21 being exposed at the bottom surface 4*f* faces each terminal of the second terminal group 52 in the supporting member 5. Although not shown, one, preferably two or more projections or concavities can be provided on the surface of the rod-shaped material 40 to be directed to the supporting member 5, and at the position corresponding to the projection or the concavity, a concavity or a projection can be formed on the surface 5*a* of the supporting member 5. Then, by coupling a pair of (preferably two pairs or more of) projection and concavity, positioning of the holding member 4 can be performed. In FIG. 13, the holding member 4 is adhered to the surface 5*a* of the supporting member 5 using the adhesive 81. If necessary, heating is performed to harden the adhesive 81. The adhesive 81 can be applied to either or both of the bonding surface of the holding member 4 and the surface 5*a* of the supporting member 5, or can be placed between the holding member 4 and the supporting member 5 after having being molded into a frame-like sheet shape, as shown in FIG. 13.

Figure 14:
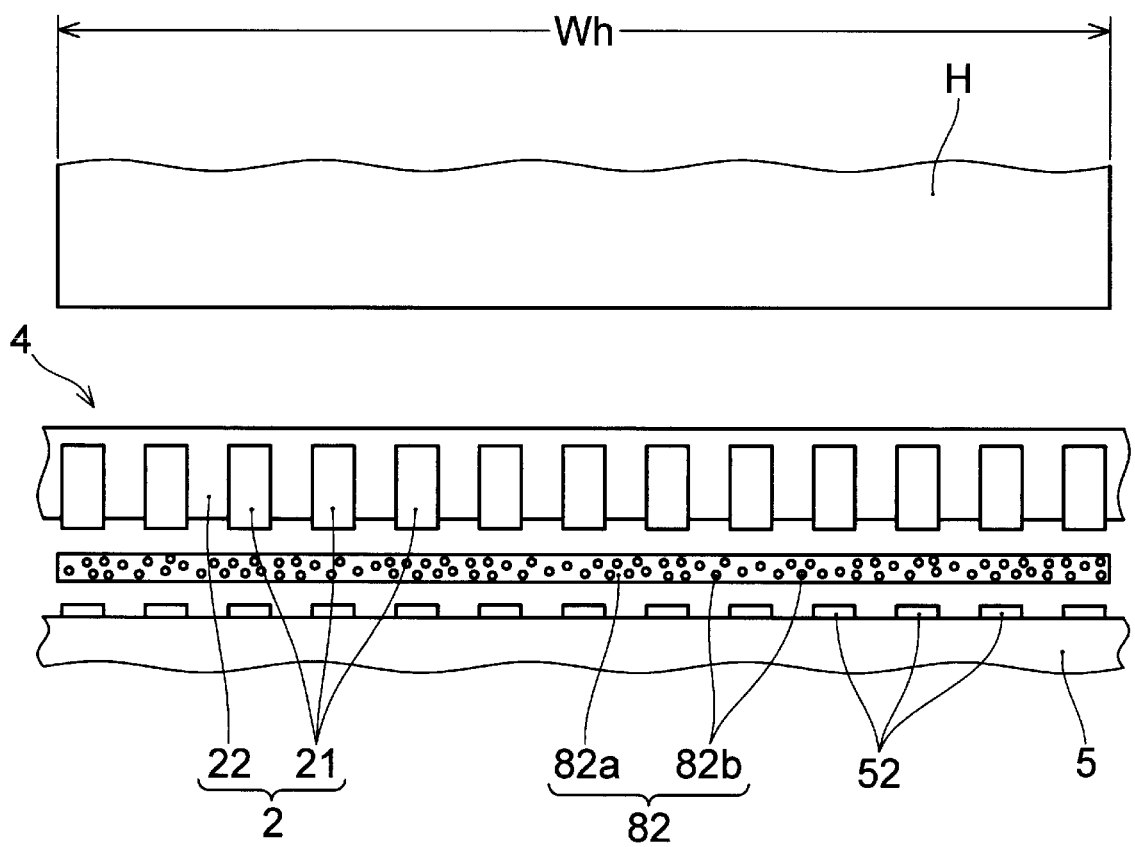
FIG. 14 shows a view of an exemplary process of connecting contactors of the holding member and a second terminal group in the method for manufacturing display apparatus according to Embodiment 2.

Each of the terminals constituting the second terminal group 52 of the supporting member 5 and each one of the plurality of contactors 21 is connected. FIG. 14 shows an exemplary process of connecting each of the terminals constituting the second terminal group 52 and each one of the plurality of contactors 21, using the ACF. The above-mentioned connection is construed to be not limited to the method using the ACF shown in FIG. 14. However, the method using the ACF is preferable in that the contactors 21 disposed at the narrow pitch can be appropriately connected to respective terminals, facing the contactors 21, of the second terminal group 52 while suppressing short circuit failures. As shown in FIG. 14, between the plurality of contactors 21 and the second terminal group 52, the ACF is disposed as the connecting means 82 for both. The plurality of contactors 21 and the second terminal group 52 are pressed against each other and heated in a state where the ACF is interposed between them. For example, the pressing and the heating are performed at the pressure of approximately 2 MPa to 4 MPa and at the temperature of approximately 170 degrees Celsius to 200 degrees Celsius for approximately five seconds to 15 seconds.

In FIG. 14, the housing portion 22 of the connector 2 or the entire holding member 4 is pressed by a heater block H toward the supporting member 5 placed on a stage (not shown). The heater block H preferably has a width Wh longer than the entire length of the plurality of contactors 21 and the entire length of the second terminal group 52 in the array direction of terminals. The ACF is pressed between the connector 2 and the supporting member 5, and thereby, neighboring conductive particles 82*b* are brought into contact with each other and/or the conductive particles 82*b* are brought into contact with the contactors 21 or each terminal of the second terminal group 52, in the thickness direction of the ACF. As a result, each one of the plurality of contactors 21 and each terminal of the second terminal group 52 facing each other are electrically connected. On the other hand, in the array direction of the plural contactors 21, the contactors 21 are not connected to each other, each terminal of the second terminal group 52 is not connected to other terminals, and further the contactor 21 and each terminal of the second terminal group 52 is not connected.

The thermosetting resin portion 82*a* once softens when heated, and enters between neighboring contactors 21 as well as between terminals of the second terminal group 52, in the array direction of the plural contactors 21. Then, the thermosetting resin portion 82*a* hardens. The state of electrical connection between the contactors 21 and the terminals of the second terminal group 52 facing the contactors 21 can be maintained, and the insulation property therebetween in the array direction of the contactors 21 can be secured. Instead of the heater block H, a heater-equipped pressurizing roller (not shown) can be used. Each one of the plurality of contactors 21 and each terminal constituting the second terminal group 52 can be pressed and heated in order in the array direction of the plural contactors 21.

As shown in FIG. 13, the display panel 3 is inserted from the discontinuous portion of the U-shaped holding member 4 into the inside of the holding member 4 while orienting the edge thereof at which the first terminal group 31 is formed toward the connector 2. More specifically, the edge of the display panel 3 is inserted into the concave portion 4*d* of the holding member 4, and the display panel 3 is moved toward the connector 2 along the concave portion 4*d*. As shown in FIG. 13, in the case where the display panel 3 is provided with the identifiers 3*d*, the edge comprising the identifiers 3*d* in the display panel 3 is inserted into the concave portion 4*d*. Then, three sides of the rectangular display panel 3 abut on and engage with wall surfaces of the holding member 4 facing the inside of the U-shaped configuration. Finally, the edge of the display panel 3 comprising the first terminal group 31 is coupled with the connector 2. As a result, each of terminals constituting the first terminal group 31 and each one of the plurality of contactors 21 is connected. Further, the display panel 3 is placed on the surface 5*a* of the supporting member 5 at the position where the above-mentioned coupling has been completed.

Preferably, in the case where the display panel 3 is provided with the identifiers 3*d*, the suitability of coupling between the display panel 3 and the connector 2 can be verified using the identifiers 3d. As a result, it is possible to prevent an outflow of defective products insufficient in coupling. As mentioned above, the apertures 4e are formed at the positions where the identifiers 3d are exposed when the edge of the display panel 3 is appropriately coupled with the connector 2. Accordingly, the suitability of coupling between the display panel 3 and the connector 2 can be verified using the identifiers 3d that are to be exposed inside the apertures 4e when the coupling is appropriate. For example, like the example shown in FIG. 13, in the case where at least two electrically connected conductor patterns are formed as the identifiers 3d, the probes P are respectively brought into contact with the identifiers 3d through the apertures 4e, as shown in FIG. 8 referred to previously. Then, by testing the conductivity between two probes P, the suitability of the coupling can be electrically verified. Further, in a case where the appearance features of the provided identifiers 3d are differentiated from appearance features of the surroundings thereof, for example, by differentiating the color from color of the surroundings thereof, the suitability of the coupling can be visually verified by observing the identifiers 3d through the apertures 4e using visual inspection, an automated optical inspector (AOI), or the like. By adopting such a configuration, the suitability of coupling can be verified very easily.

In FIG. 13, the display panel 3 is inserted inside the U-shaped configuration of the holding member 4 that has been already adhered onto the surface 5a of the supporting member 5. However, the display panel 3 can be inserted into the holding member 4 (the rod-shaped material 40) before being adhered onto the supporting member 5 and can be connected to the connector 2 before being adhered to the supporting member 5. In addition, the display panel 3 can be placed on the supporting member 5 together with the rod-shaped material 40.

The method for manufacturing display apparatus according to the present embodiment can further comprise covering the connecting portion with the covering member 7, by supplying a resin to the connecting portion between the plurality of contactors 21 and the second terminal group 52, or by providing an organic film or an inorganic film so as to cover the connection portion, as shown in FIG. 1 and the like referred to previously. FIG. 13 shows a film like member 71 that can serve as the covering member 7 shown in FIG. 1 and the like. An organic film deposited using an epoxy resin, an acrylic resin, or a silicone resin and an inorganic film deposited by vapor-deposition of aluminum, sputtering of silicon nitride, or the like are examples of the film like member 71. The film like member 71 constituted by the organic film or the inorganic film described above is positioned in such a way as to cover the connecting portion between the contactors 21 and the second terminal group 52 and then heated so as to be brought into close contact with the connecting portion between the contactors 21 and the second terminal group 52. As a result, the connecting portion between the plurality of contactors 21 and the second terminal group 52 is covered with the covering member 7. Preferably, the exposed portions of the contactors 21 and the second terminal group 52 are entirely covered. The covering member 7 can be provided by supplying an epoxy resin, a silicone resin, or the like in an unsolidified state to the connecting portion between the plurality of contactors 21 and the second terminal group 52 using a dispenser or the like and solidifying the supplied resin with heat, ultraviolet-ray, or the like. Through the above-mentioned processes, the display apparatus 1 shown in FIGS. 1 to 4 can be completed.

The method for manufacturing display apparatus according to the present embodiment can comprise covering the gap between the display panel 3 and the holding member 4 and/or the gap between the edge of the display panel 3 not engaged with the holding member 4 and the supporting member 5 with a silicone resin or the like, as described above. Further, as described above, the method for manufacturing display apparatus according to the present embodiment can comprise providing a through hole (not shown) in the holding member 4 and sucking out air from the space between the display panel 3 and the supporting member 5 to the outside of the holding member 4 via the through hole.

SUMMARY (1) A display apparatus according to one embodiment of the present invention comprises: a display panel comprising a plurality of driving elements to drive pixels, and comprising a first terminal group at least at a part of an edge of the display panel, the first terminal group being electrically connected to the plurality of driving elements; a supporting member comprising a surface on which the display panel is to be placed, and comprising, on the surface, a plurality of wirings and a second terminal group connected to the plurality of wirings; and a holding member provided along an edge of the display panel using a rod-shaped material having a linear or curved shape, wherein the holding member comprises a connector provided with a plurality of contactors, and is adhered to the surface so as to hold the display panel at a given position on the surface of the supporting member, wherein each one of the plurality of contactors is positioned in such a way as to face each of terminals constituting the first terminal group, each one of the plurality of contactors is connected to each of terminals constituting the second terminal group, and at least a part of the edge of the display panel is coupled with the connector, and each of terminals constituting the first terminal group is electrically connected to each one of the plurality of wirings of the supporting member via each one of the plurality of contactors.

According to the above-mentioned configuration of (1), the display panel or the supporting member can be easily reused in the display apparatus or another display apparatus, and the means for transmitting signals to the display panel can be provided without impairing aesthetic appearance of the display apparatus.

(2) In the display apparatus according to (1) described above, the supporting member can comprise a window glass of a vehicle. In that case, it is possible to provide the display apparatus comprising the wiring that is unlikely to swing against vibrations of a vehicle and accordingly unlikely to spoil the view.

(3) In the display apparatus according to (2) described above, the supporting member can comprise a windshield of an automobile, and the plurality of wirings can be provided within an area to be an upper 20% region of a projection image of the windshield projected on a plane orthogonal to the back-and-forth direction of the automobile. In that case, the forward field of vision during driving can be sufficiently secured, and it is possible to contribute to safe navigation.

(4) In the display apparatus according to (3) described above, the windshield can be exposed between wirings each being one of the plurality of wirings. In that case, even when the plurality of wirings is formed of a light-shielding material, the forward situation can be visually recognized through the gaps thereof.

(5) In the display apparatus according to any one of (1) to (4) described above, the holding member can comprise a bottom surface directed to the surface of the supporting member, a side surface directed to the display panel, and a groove formed on the side surface so as to constitute the connector, the plurality of contactors can be exposed inside the groove, and can be exposed at the bottom surface of the holding member, at least a part of the edge of the display panel can be inserted into the groove, and each of terminals constituting the first terminal group can be connected to each one of the plurality of contactors at an inside of the groove, and each of terminals constituting the second terminal group can be connected to each one of the plurality of contactors at the bottom surface of the holding member. In that case, by simply engaging the display panel with the holding member, each terminal of the first terminal group can be electrically connected to each wiring on the supporting member.

(6) In the display apparatus according to (5) described above, each one of the plurality of contactors can be formed using a plate-shaped member, and the plurality of contactors can be positioned on one inner wall inside the groove and curved toward an opposing inner wall. In that case, each terminal of the first terminal group comes into contact with the contactor with a sufficient contact pressure, and the contact state thereof can be maintained.

(7) In the display apparatus according to any one of (1) to (6) described above, the display panel can comprise an identifier exposed at an edge at which the holding member is provided and differentiated from the periphery of the identifier in appearance features or electrical characteristics, and the holding member can comprise a concave portion to which an edge of the display panel provided with the identifier is to be inserted and an aperture communicating with an inside of the concave portion, wherein the aperture exposes the identifier when an edge of the display panel is appropriately coupled with the connector. By doing so, the suitability of coupling between the display panel and the connector can be verified.

(8) In the display apparatus according to (7) described above, the identifier can comprise at least two conductive pads, and the at least two conductive pads can be electrically connected to each other. In that case, the suitability of coupling between the display panel and the connector can be easily verified electrically.

(9) In the display apparatus according to any one of (1) to (8) described above, the wirings and the second terminal group can be formed on a base material separate from the supporting member, and the base material can be adhered to the surface of the supporting member. In that case, the wirings and the second terminal group can be easily formed compared to a case where they are formed on the supporting member.

(10) In the display apparatus according to any one of (1) to (9) described above, a connecting portion between the plurality of contactors and the second terminal group can be covered with a resinous solidified substance, an organic film, or an inorganic film. In that case, short circuit failures due to contact with an external conductive material, dew condensation, or the like can be prevented.

(11) In the display apparatus according to any one of (1) to (10) described above, either or both of an ultraviolet-ray absorbing layer and an infrared-ray reflective layer can be formed on a surface, of the display panel, to be directed to the supporting member. In that case, it is possible to suppress deterioration of the display panel due to heat and/or ultraviolet-ray.

(12) In the display apparatus according to any one of (1) to (11) described above, the display panel can comprise a stepped portion caused by a pixel forming region on a surface to be directed to the supporting member, and an auxiliary member having a thickness corresponding to a height of the stepped portion can be provided around the pixel forming region between the supporting member and the display panel. In that case, the display panel can be stably held on the supporting member.

(13) A method for manufacturing display apparatus according to another embodiment of the present invention comprises: forming a display panel comprising pixels, a plurality of driving elements to drive the pixels, and a first terminal group electrically connected to the plurality of driving elements; forming a plurality of wirings and a second terminal group connected to the plurality of wirings on a surface of a supporting member, wherein the supporting member comprises the surface on which the display panel is to be placed; forming a connector at a part of a rod-shaped material having a linear or curved shape by arranging a plurality of contactors on the rod-shaped material in a layout corresponding to a layout of each of terminals constituting the first terminal group; providing a holding member to hold the display panel on the surface by adhering the rod-shaped material to the surface of the supporting member; connecting each of terminals constituting the second terminal group and each one of the plurality of contactors; connecting each of terminals constituting the first terminal group to each one of the plurality of contactors by coupling at least a part of an edge of the display panel with the connector; and placing the display panel on the surface of the supporting member.

According to the above-mentioned configuration of (13), it is possible to easily manufacture the display apparatus in which reusing constituent elements is easy, the display panel is properly positioned, and the means for transmitting signals to the display panel is provided without impairing aesthetic appearance of the display apparatus.

(14) The method for manufacturing display apparatus according to (13) described above further comprises covering a connecting portion between the plurality of contactors and the second terminal group by supplying a resin to the connecting portion or providing an organic film or an inorganic film so as to cover the connecting portion. By doing so, it is possible to prevent short circuit failures due to contact with an external conductive material, dew condensation, or the like.

(15) The method for manufacturing display apparatus according to (13) or (14) described above can further comprise providing an identifier, in formation of the display panel, so as to be exposed at an edge of the display panel, the identifier being differentiated from surroundings of the identifier in appearance features or electrical characteristics; forming, at the rod-shaped material, a concave portion to which an edge comprising the identifier in the display panel is to be inserted and an aperture communicating with an inside of the concave portion, wherein the aperture exposes the identifier when an edge of the display panel is appropriately coupled with the connector; and verifying suitability of coupling between an edge of the display panel and the connector using the identifier to be exposed inside the aperture. By doing so, it is possible to prevent an outflow of defective products insufficient in coupling between the display panel and the connector.

(16) In the method for manufacturing display apparatus according to (15) described above, at least two conductive pads electrically connected to each other can be formed as the identifier, a probe can be brought into contact with the identifier through the aperture, and the suitability can be electrically verified. By doing so, it is possible to surely detect a defective product insufficient in coupling between the display panel and the connector.

(17) In the method for manufacturing display apparatus according to (15) described above, the identifier can be provided by differentiating a portion where the identifier is provided from surroundings of the portion in color, the identifier can be observed through the aperture, and the suitability can be visually verified. By doing so, it is possible to very easily verify the suitability of coupling between the display panel and the connector.

DESCRIPTION OF REFERENCE NUMERAL 1 display apparatus
2 connector
21 contactor
23 groove
3 display panel
3a pixel
3c pixel forming region
3d identifier
31 first terminal group
39 driving element (TFT)
4 holding member
40 rod-shaped material
4d concave portion
4e aperture
4f bottom surface
4g side surface
5 supporting member
50 base material
51 wiring
52 second terminal group
5a surface
61, 61a optical functional layer
7 covering member
82 connecting means (ACF)
9 auxiliary member
P probe

What is claimed is:

1. A display apparatus comprising:
a display panel comprising a plurality of driving elements to drive pixels, and comprising a first terminal group at least at a part of an edge of the display panel, the first terminal group being electrically connected to the plurality of driving elements;
a supporting member comprising a surface on which the display panel is to be placed and being provided with a plurality of wirings on the surface; and
a holding member comprising a rod-shaped material, the rod-shaped material being provided along an edge of the display panel and having a linear or curved shape, wherein
the holding member comprises a connector to be coupled with the display panel, and is adhered to the surface so as to hold the display panel at a given position, and
each of terminals constituting the first terminal group is electrically connected to each one of the plurality of wirings of the supporting member via the connector.

2. The display apparatus according to claim 1, wherein the supporting member comprises a window glass of a vehicle.

3. The display apparatus according to claim 1, wherein a weak adhesive layer being formed of an adherent material is provided between the display panel and the surface of the supporting member.

4. The display apparatus according to claim 1, wherein
the holding member comprises a groove being formed on a side surface to face the display panel so as to constitute the connector,
the connector comprises a plurality of contactors being positioned in such a way as to face each of terminals constituting the first terminal group and being exposed inside the groove,
at least a part of the edge of the display panel is inserted into the groove, and
each of terminals constituting the first terminal group is connected to each one of the plurality of contactors at an inside of the groove.

5. The display apparatus according to claim 4, wherein
each one of the plurality of contactors comprises a plate-shaped member, and
the plurality of contactors is positioned on one inner wall inside the groove and curved toward an opposing inner wall.

6. The display apparatus according to claim 4, wherein
the supporting member further comprises a second terminal group on the surface, wherein the second terminal group is connected to the plurality of wirings, and
each of terminals constituting the second terminal group is connected to an exposed portion of each one of the plurality of contactors, the exposed portion being exposed out of the holding member.

7. The display apparatus according to claim 6, wherein a connecting portion between the plurality of contactors and the second terminal group is covered with a resinous solidified substance, an organic film, or an inorganic film.

8. The display apparatus according to claim 6, wherein the plurality of contactors being provided to the connector and the second terminal group are connected to each other with an anisotropic conductive film.

9. The display apparatus according to claim 1, wherein
the display panel comprises an identifier exposed at an edge at which the holding member is provided and differentiated from the periphery of the identifier in appearance features or electrical characteristics, and
the holding member comprises a concave portion to which an edge of the display panel provided with the identifier is to be inserted and an aperture communicating with an inside of the concave portion, wherein the aperture exposes the identifier when an edge of the display panel is appropriately coupled with the connector.

10. The display apparatus according to claim 1, wherein the wirings are formed on a base material separate from the supporting member, and the base material is adhered to the surface of the supporting member.

11. The display apparatus according to claim 1, wherein the display panel comprises a stepped portion caused by a pixel forming region on a surface to be directed to the supporting member, and
an auxiliary member having a thickness corresponding to a height of the stepped portion is provided around the pixel forming region between the supporting member and the display panel.

12. The display apparatus according to claim 1, wherein the supporting member is formed of a light-transmitting material.

13. The display apparatus according to claim 1, wherein the holding member comprises:
- a first part and a second part facing each other and a third part connecting the first part and the second part through the third part so as to form a frame shape; and
- a groove into which the edge of the display panel is inserted, the groove being formed on respective side surfaces of the first part, the second part, and the third part, and the connector comprises a part of the groove.

14. A method for manufacturing display apparatus, comprising:
- forming a display panel comprising pixels, a plurality of driving elements to drive the pixels, and a first terminal group electrically connected to the plurality of driving elements;
- forming a plurality of wirings on a surface of a supporting member, wherein the supporting member comprises the surface on which the display panel is to be placed;
- forming a connector at a part of a rod-shaped material having a linear or curved shape by arranging a plurality of contactors on the rod-shaped material;
- providing a holding member to hold the display panel on the surface by adhering the rod-shaped material to the surface of the supporting member;
- placing the display panel on the surface of the supporting member; and
- electrically connecting each of terminals constituting the first terminal group to each one of the plurality of wirings of the supporting member via the connector.

15. The method for manufacturing display apparatus according to claim 14, further comprising forming a second terminal group connected to the plurality of wirings on the surface of the supporting member, wherein
- at least a part of an edge of the display panel is coupled with the connector and each of terminals constituting the second terminal group is connected to each one of the plurality of contactors, so that each of the terminals of the first terminal group is electrically connected to each one of the plurality of wirings.

16. The method for manufacturing display apparatus according to claim 15, wherein the plurality of contactors constituting the connector and the second terminal group are connected to each other with an anisotropic conductive film.

17. The method for manufacturing display apparatus according to claim 14, further comprising:
- providing a projection or concavity on a surface of the rod-shaped material to be directed to the supporting member;
- providing a concavity or projection at a position on the surface of the supporting member, the position corresponding to the projection or concavity provided to the rod-shaped material; and
- positioning the holding member on the surface of the supporting member by coupling the projection or concavity being provided to the rod-shaped material and the concavity or projection being provided to the supporting member with each other.

18. The method for manufacturing display apparatus according to claim 14, further comprising:
- providing an identifier, in formation of the display panel, so as to be exposed at an edge of the display panel, the identifier being differentiated from surroundings of the identifier in appearance features or electrical characteristics;
- forming, at the rod-shaped material, a concave portion to which an edge comprising the identifier in the display panel is to be inserted and an aperture communicating with an inside of the concave portion, wherein the aperture exposes the identifier when an edge of the display panel is appropriately coupled with the connector; and
- verifying suitability of coupling between an edge of the display panel and the connector using the identifier to be exposed inside the aperture.

19. The method for manufacturing display apparatus according to claim 14, wherein the supporting member is formed of a light-transmitting material.

20. The method for manufacturing display apparatus according to claim 14, wherein
the holding member comprises:
- a first part and a second part facing each other and a third part connecting the first part and the second part through the third part so as to form a frame shape; and
- a groove being formed on respective side surfaces of the first part, the second part, and the third part, the connector comprises a part of the groove, and
the method further comprises coupling at least a part of an edge of the display panel with the connector by inserting the edge of the display panel into the groove.

* * * * *